(12) United States Patent
Mital et al.

(10) Patent No.: US 10,621,204 B2
(45) Date of Patent: *Apr. 14, 2020

(54) BUSINESS APPLICATION PUBLICATION

(71) Applicant: Microsoft Technology Licensing, LLC, Redmond, WA (US)

(72) Inventors: Vijay Mital, Redmond, WA (US); Max Uritsky, Redmond, WA (US); Suraj Poozhiyil, Redmond, WA (US); Moe Khosravy, Redmond, WA (US); Robert Fries, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/790,336

(22) Filed: Jul. 2, 2015

(65) Prior Publication Data
US 2015/0302074 A1    Oct. 22, 2015

Related U.S. Application Data

(63) Continuation of application No. 12/971,782, filed on Dec. 17, 2010, now Pat. No. 9,104,992.

(51) Int. Cl.
*G06F 16/951*    (2019.01)
*G06F 16/28*    (2019.01)
(Continued)

(52) U.S. Cl.
CPC .......... *G06F 16/283* (2019.01); *G06F 16/951* (2019.01); *G06Q 10/06* (2013.01); *G06F 16/254* (2019.01)

(58) Field of Classification Search
USPC ........................................................ 707/741
See application file for complete search history.

(56) References Cited

U.S. PATENT DOCUMENTS 4,633,430 A   12/1986   Cooper
5,296,666 A   3/1994   Varadan et al.
(Continued)

OTHER PUBLICATIONS

"Non-Final Office Action Issued in U.S. Appl. No. 12/971,685", dated Apr. 24, 2014, filed Dec. 17, 2010, 15 Pages.
(Continued)

*Primary Examiner* — Tamara T Kyle
*Assistant Examiner* — Raheem Hoffler
(74) *Attorney, Agent, or Firm* — International IP Law Group, PLLC

(57) ABSTRACT

A data marketplace infrastructure provides a crowd sourcing solution to development, discovery and publication of decision applications. Applications can be submitted from a user to a data warehouse in association with a data feed. One or more discovery properties are determined with regard to each application. The applications are made available to other client systems in association with the data feed. A relevant data feed and a relevant application can be identified based on satisfaction of a discovery request by the one or more determined discovery properties of the application. The application can be selected and downloaded to the user for evaluation and customization. The customized application can then be submitted to the data warehouse for publication with the other applications associated with the data feed.

21 Claims, 10 Drawing Sheets

(51) Int. Cl.
    *G06Q 10/06*       (2012.01)
    *G06F 16/25*       (2019.01)

(56) References Cited

U.S. PATENT DOCUMENTS

| | | | |
|---|---|---|---|
| 5,669,007 A | 9/1997 | Tateishi | |
| 5,689,711 A | 11/1997 | Bardasz et al. | |
| 5,867,714 A | 2/1999 | Todd et al. | |
| 6,049,673 A | 4/2000 | McComb et al. | |
| 6,326,962 B1 | 12/2001 | Szabo | |
| 6,512,530 B1 | 1/2003 | Rzepkowski et al. | |
| 6,662,355 B1 | 12/2003 | Caswell et al. | |
| 6,691,100 B1 | 2/2004 | Alavi et al. | |
| 6,694,329 B2 | 2/2004 | Murray | |
| 6,865,720 B1 | 3/2005 | Otani et al. | |
| 6,931,589 B2 | 8/2005 | Baltsan et al. | |
| 6,995,768 B2 | 2/2006 | Jou et al. | |
| 7,028,306 B2 | 4/2006 | Boloker et al. | |
| 7,065,493 B1 | 6/2006 | Homsi | |
| 7,263,663 B2 | 8/2007 | Ballard et al. | |
| 7,263,694 B2 | 8/2007 | Clewis et al. | |
| 7,315,305 B2 | 1/2008 | Crotty et al. | |
| 7,315,861 B2 | 1/2008 | Seibel et al. | |
| 7,343,585 B1 | 3/2008 | Lau et al. | |
| 7,349,947 B1 | 3/2008 | Slage et al. | |
| 7,356,559 B1 | 4/2008 | Jacobs et al. | |
| 7,440,902 B2 | 10/2008 | Greenstein et al. | |
| 7,506,243 B2 | 3/2009 | Kotler et al. | |
| 7,603,620 B2 | 10/2009 | Erol et al. | |
| 7,672,950 B2 | 3/2010 | Eckardt, III et al. | |
| 7,752,314 B2 | 7/2010 | Trevor et al. | |
| 7,752,536 B2 | 7/2010 | Megiddo et al. | |
| 7,774,791 B1 | 8/2010 | Appelbaum et al. | |
| 7,802,230 B1 | 9/2010 | Mendicino et al. | |
| 7,870,545 B2 | 1/2011 | Saha et al. | |
| 7,900,111 B1 | 3/2011 | Kim et al. | |
| 7,908,186 B2 | 3/2011 | Gabelmann et al. | |
| 7,941,791 B2 | 5/2011 | Wang et al. | |
| 8,032,409 B1 | 10/2011 | Mikurak | |
| 8,032,875 B2 | 10/2011 | Kosche et al. | |
| 8,117,606 B2 | 2/2012 | Chakrabarti et al. | |
| 8,135,655 B2 | 3/2012 | Oaten et al. | |
| 8,201,160 B2 | 6/2012 | Hauser | |
| 8,214,380 B1* | 7/2012 | Bettinger | G06F 16/9535 707/758 |
| 8,301,585 B2 | 10/2012 | Mourey et al. | |
| 8,332,772 B2 | 12/2012 | Janzen et al. | |
| 8,429,630 B2 | 4/2013 | Nickolov et al. | |
| 8,473,473 B2 | 6/2013 | Wang et al. | |
| 8,589,172 B2 | 11/2013 | Alonso et al. | |
| 8,635,211 B2 | 1/2014 | Jiang et al. | |
| 8,713,058 B2 | 4/2014 | Nagoski et al. | |
| 8,930,204 B1 | 1/2015 | Igoe et al. | |
| 9,069,557 B2 | 6/2015 | Mital et al. | |
| 9,110,957 B2 | 8/2015 | Mital et al. | |
| 9,111,238 B2 | 8/2015 | Mital et al. | |
| 9,171,272 B2 | 10/2015 | Mital et al. | |
| 9,304,672 B2 | 4/2016 | Mital et al. | |
| 9,336,184 B2 | 5/2016 | Mital et al. | |
| 9,582,475 B2 | 2/2017 | Sekharan | |
| 9,864,966 B2 | 1/2018 | Mital et al. | |
| 2001/0047372 A1 | 11/2001 | Gorelik et al. | |
| 2002/0065673 A1 | 5/2002 | Rooke | |
| 2002/0066782 A1 | 6/2002 | Swaminathan et al. | |
| 2002/0091609 A1 | 7/2002 | Markowski | |
| 2002/0099710 A1* | 7/2002 | Papierniak | G06F 16/248 |
| 2002/0143800 A1 | 10/2002 | Lindberg et al. | |
| 2002/0169658 A1 | 11/2002 | Adler | |
| 2002/0188527 A1 | 12/2002 | Dillard et al. | |
| 2002/0191199 A1 | 12/2002 | Imada et al. | |
| 2003/0040962 A1 | 2/2003 | Lewis | |
| 2003/0041104 A1 | 2/2003 | Wingard et al. | |
| 2003/0144868 A1 | 7/2003 | MacIntyre et al. | |
| 2004/0015481 A1 | 1/2004 | Zinda | |
| 2004/0064351 A1 | 4/2004 | Mikurak | |
| 2004/0098358 A1 | 5/2004 | Roediger | |
| 2004/0117358 A1 | 6/2004 | von kaenel et al. | |
| 2004/0148586 A1 | 7/2004 | Gilboa | |
| 2004/0153992 A1 | 8/2004 | Molina-Moreno et al. | |
| 2004/0162842 A1 | 8/2004 | Ono et al. | |
| 2004/0163039 A1 | 8/2004 | Gorman | |
| 2004/0181519 A1 | 9/2004 | Anwar | |
| 2005/0004911 A1 | 1/2005 | Goldberg et al. | |
| 2005/0043961 A1 | 2/2005 | Torres et al. | |
| 2005/0187809 A1 | 8/2005 | Falkenhainer | |
| 2005/0231392 A1 | 10/2005 | Meehan et al. | |
| 2005/0257157 A1 | 11/2005 | Gilboa et al. | |
| 2006/0037019 A1 | 2/2006 | Austin et al. | |
| 2006/0074882 A1 | 4/2006 | Scherer et al. | |
| 2006/0080400 A1 | 4/2006 | Guha | |
| 2006/0107211 A1 | 5/2006 | Mirtich et al. | |
| 2006/0178918 A1 | 8/2006 | Mikurak | |
| 2006/0224668 A1 | 10/2006 | Ginis | |
| 2006/0229853 A1 | 10/2006 | Evans | |
| 2007/0005477 A1 | 1/2007 | McAtamney | |
| 2007/0011175 A1 | 1/2007 | Langseth et al. | |
| 2007/0013697 A1 | 1/2007 | Gilboa | |
| 2007/0021992 A1 | 1/2007 | Konakalla | |
| 2007/0038657 A1 | 2/2007 | Denton et al. | |
| 2007/0046664 A1 | 3/2007 | Raspl et al. | |
| 2007/0061711 A1* | 3/2007 | Bodin | G06Q 10/10 715/234 |
| 2007/0094609 A1 | 4/2007 | Gilboa et al. | |
| 2007/0112714 A1 | 5/2007 | Fairweather | |
| 2007/0118394 A1 | 5/2007 | Cahoon | |
| 2007/0124285 A1 | 5/2007 | Wright et al. | |
| 2007/0136326 A1 | 6/2007 | McClement et al. | |
| 2007/0153706 A1 | 7/2007 | Melcher et al. | |
| 2007/0162444 A1 | 7/2007 | Haselden et al. | |
| 2007/0179941 A1 | 8/2007 | Huang et al. | |
| 2007/0185746 A1 | 8/2007 | Chieu et al. | |
| 2007/0250764 A1 | 10/2007 | Jiang et al. | |
| 2007/0265995 A1 | 11/2007 | Remington et al. | |
| 2007/0294614 A1 | 12/2007 | Jacquin et al. | |
| 2008/0040346 A1 | 2/2008 | Aggarwal et al. | |
| 2008/0046919 A1* | 2/2008 | Carmi | H04N 7/10 725/32 |
| 2008/0058969 A1 | 3/2008 | Nixon et al. | |
| 2008/0104496 A1 | 5/2008 | Williams et al. | |
| 2008/0120111 A1 | 5/2008 | Doyle | |
| 2008/0127052 A1 | 5/2008 | Rostoker | |
| 2008/0163125 A1 | 7/2008 | Gu et al. | |
| 2008/0178083 A1 | 7/2008 | Bergman et al. | |
| 2008/0183710 A1 | 7/2008 | Serjeantson et al. | |
| 2008/0183744 A1 | 7/2008 | Adendorff et al. | |
| 2008/0184140 A1 | 7/2008 | Koerner | |
| 2008/0184167 A1 | 7/2008 | Berrill et al. | |
| 2008/0189438 A1 | 8/2008 | Zimmerer et al. | |
| 2008/0189724 A1 | 8/2008 | Tien et al. | |
| 2008/0195930 A1 | 8/2008 | Tolle | |
| 2008/0201293 A1 | 8/2008 | Grosset et al. | |
| 2008/0209314 A1 | 8/2008 | Sylthe et al. | |
| 2008/0215559 A1 | 9/2008 | Fontoura et al. | |
| 2008/0238925 A1 | 10/2008 | Meehan et al. | |
| 2008/0263012 A1* | 10/2008 | Jones | G06K 9/00711 |
| 2008/0271127 A1 | 10/2008 | Meehan et al. | |
| 2008/0288889 A1 | 11/2008 | Hunt et al. | |
| 2008/0294996 A1 | 11/2008 | Hunt et al. | |
| 2008/0301540 A1 | 12/2008 | Sava et al. | |
| 2008/0306981 A1 | 12/2008 | Jiang et al. | |
| 2008/0307334 A1 | 12/2008 | Chaudhri et al. | |
| 2008/0307385 A1 | 12/2008 | Dreiling et al. | |
| 2008/0313650 A1* | 12/2008 | Arnquist | G06F 9/451 719/316 |
| 2008/0319829 A1 | 12/2008 | Hunt et al. | |
| 2009/0006148 A1 | 1/2009 | Bacalski et al. | |
| 2009/0007062 A1 | 1/2009 | Gilboa | |
| 2009/0037363 A1 | 2/2009 | Kozlov et al. | |
| 2009/0049422 A1 | 2/2009 | Rage et al. | |
| 2009/0070712 A1 | 3/2009 | Schubert et al. | |
| 2009/0083652 A1 | 3/2009 | Krasner et al. | |
| 2009/0094674 A1 | 4/2009 | Schwartz et al. | |
| 2009/0100360 A1 | 4/2009 | Janzen et al. | |
| 2009/0100407 A1 | 4/2009 | Bouillet et al. | |

(56) References Cited

U.S. PATENT DOCUMENTS

| | | | |
|---|---|---|---|
| 2009/0113146 A1* | 4/2009 | Minz | G06F 21/72 |
| | | | 711/154 |
| 2009/0125553 A1 | 5/2009 | Dickinson | |
| 2009/0138415 A1 | 5/2009 | Lancaster | |
| 2009/0138686 A1 | 5/2009 | Gruetzner et al. | |
| 2009/0144157 A1 | 6/2009 | Saracino et al. | |
| 2009/0144295 A1 | 6/2009 | Mion et al. | |
| 2009/0164486 A1 | 6/2009 | Foeldesi et al. | |
| 2009/0172024 A1 | 7/2009 | Hsu et al. | |
| 2009/0172773 A1 | 7/2009 | Moore | |
| 2009/0216758 A1 | 8/2009 | Tuttle et al. | |
| 2009/0224941 A1 | 9/2009 | Kansai et al. | |
| 2009/0225082 A1 | 9/2009 | Hargrove et al. | |
| 2009/0254971 A1 | 10/2009 | Herz et al. | |
| 2009/0287814 A1 | 11/2009 | Robertson et al. | |
| 2009/0300544 A1 | 12/2009 | Psenka et al. | |
| 2009/0312992 A1 | 12/2009 | Chen et al. | |
| 2009/0322739 A1 | 12/2009 | Rubin et al. | |
| 2009/0323383 A1* | 12/2009 | Mondaeev | G11C 15/00 |
| | | | 365/49.17 |
| 2009/0327878 A1* | 12/2009 | Grandison | G06F 17/30719 |
| | | | 715/256 |
| 2010/0005420 A1 | 1/2010 | Schneider et al. | |
| 2010/0042623 A1 | 2/2010 | Feng et al. | |
| 2010/0049686 A1 | 2/2010 | Gotz et al. | |
| 2010/0057753 A1 | 3/2010 | Gotz et al. | |
| 2010/0070448 A1 | 3/2010 | Omoigui | |
| 2010/0070489 A1 | 3/2010 | Aymeloglu et al. | |
| 2010/0088258 A1 | 4/2010 | Oaten et al. | |
| 2010/0095269 A1 | 4/2010 | Bouillet et al. | |
| 2010/0100561 A1 | 4/2010 | Cooper et al. | |
| 2010/0100899 A1 | 4/2010 | Bradbury et al. | |
| 2010/0106853 A1 | 4/2010 | Kashiyama et al. | |
| 2010/0131255 A1 | 5/2010 | Beckman et al. | |
| 2010/0131293 A1 | 5/2010 | Linthicum et al. | |
| 2010/0138231 A1 | 6/2010 | Linthicum et al. | |
| 2010/0138753 A1 | 6/2010 | Riggs et al. | |
| 2010/0145902 A1 | 6/2010 | Boyan et al. | |
| 2010/0158048 A1* | 6/2010 | Arimilli | G06F 11/106 |
| | | | 370/476 |
| 2010/0161576 A1 | 6/2010 | Chen et al. | |
| 2010/0179951 A1 | 7/2010 | McPhail | |
| 2010/0185968 A1* | 7/2010 | Hsu | G06Q 30/02 |
| | | | 715/771 |
| 2010/0198697 A1 | 8/2010 | Brown et al. | |
| 2010/0199181 A1 | 8/2010 | Robertson et al. | |
| 2010/0199184 A1* | 8/2010 | Horowitz | G06Q 10/10 |
| | | | 715/733 |
| 2010/0205178 A1 | 8/2010 | Bush et al. | |
| 2010/0205238 A1 | 8/2010 | Cao et al. | |
| 2010/0241620 A1 | 9/2010 | Manister et al. | |
| 2010/0250931 A1* | 9/2010 | Andersen | G06Q 30/02 |
| | | | 713/168 |
| 2010/0287014 A1 | 11/2010 | Gaulin et al. | |
| 2010/0287459 A1 | 11/2010 | Mital et al. | |
| 2010/0332404 A1* | 12/2010 | Valin | G06Q 30/0239 |
| | | | 705/310 |
| 2011/0029636 A1 | 2/2011 | Smyth et al. | |
| 2011/0047525 A1 | 2/2011 | Castellanos et al. | |
| 2011/0072000 A1 | 3/2011 | Haas et al. | |
| 2011/0072001 A1 | 3/2011 | Basu et al. | |
| 2011/0072046 A1 | 3/2011 | Chi | |
| 2011/0078101 A1 | 3/2011 | Gotz et al. | |
| 2011/0078160 A1 | 3/2011 | Gotz et al. | |
| 2011/0093430 A1 | 4/2011 | B'Far et al. | |
| 2011/0131253 A1 | 6/2011 | Peukert et al. | |
| 2011/0131588 A1* | 6/2011 | Allam | H04L 41/0604 |
| | | | 719/318 |
| 2011/0173570 A1 | 7/2011 | Moromisato et al. | |
| 2011/0179020 A1 | 7/2011 | Ozzie et al. | |
| 2011/0225417 A1 | 9/2011 | Maharajh et al. | |
| 2011/0231385 A1 | 9/2011 | Wang et al. | |
| 2011/0238653 A1 | 9/2011 | Wang et al. | |
| 2011/0271293 A1 | 11/2011 | Huegel | |
| 2011/0295793 A1 | 12/2011 | Venkatasubramanian et al. | |
| 2011/0295795 A1 | 12/2011 | Venkatasubramanian et al. | |
| 2011/0295853 A1 | 12/2011 | Li et al. | |
| 2011/0314007 A1 | 12/2011 | Dassa et al. | |
| 2012/0054147 A1 | 3/2012 | Goetz et al. | |
| 2012/0158643 A1 | 6/2012 | Mital et al. | |
| 2012/0158644 A1 | 6/2012 | Mital et al. | |
| 2012/0158731 A1 | 6/2012 | Gherman et al. | |
| 2012/0158732 A1 | 6/2012 | Mital et al. | |
| 2012/0158754 A1 | 6/2012 | Mital et al. | |
| 2012/0159312 A1 | 6/2012 | Mital et al. | |
| 2012/0159333 A1 | 6/2012 | Mital et al. | |
| 2012/0159465 A1 | 6/2012 | Mital et al. | |
| 2015/0302074 A1 | 10/2015 | Mital et al. | |
| 2015/0331918 A1 | 11/2015 | Mital et al. | |
| 2015/0378567 A1 | 12/2015 | Mital et al. | |
| 2015/0379108 A1 | 12/2015 | Mital et al. | |
| 2017/0154089 A1 | 6/2017 | Sherman | |
| 2017/0300461 A1 | 10/2017 | Mital et al. | |

OTHER PUBLICATIONS

Non-Final Office Action Issued in U.S. Appl. No. 12/971,685, dated Nov. 20, 2014, 17 Pages.

Notice of Allowance Issued in U.S. Appl. No. 12/971,685, dated Apr. 8, 2015, 8 Pages.

Non-final Office Action in U.S. Appl. No. 14/794,021, dated Oct. 7, 2015, pp. 14.

Non-final Office Action in U.S. Appl. No. 12/972,249, dated Jul. 31, 2014, filed Dec. 17, 2010, 30 Pages.

Final Office Action in U.S. Appl. No. 12/972,249, dated Feb. 6, 2015, filed Dec. 17, 2010, 40 Pages.

Notice of Allowance in U.S. Appl. No. 12/972,249, dated Nov. 24, 2015, 15 Pages.

Non-final Office Action in U.S. Appl. No. 12/971,725, dated Aug. 21, 2012, filed Dec. 17, 2010, pp. 11.

Final Office Action in U.S. Appl. No. 12/971,725, dated May 1, 2013, filed Dec. 17, 2010, pp. 15.

Non-final Office Action Issued in U.S. Appl. No. 12/971,725, dated Jun. 23, 2014, filed Dec. 17, 2010, 19 Pages.

Final Office Action Issued in U.S. Appl. No. 12/971,725, dated Jan. 15, 2015, filed Dec. 17, 2010, 21 Pages.

Notice of Allowance Issued in U.S. Appl. No. 12/971,725, dated Jun. 18, 2015, 8 Pages.

Non-final Office Action in U.S. Appl. No. 12/971,782, dated Jul. 13, 2012, filed Dec. 17, 2010, pp. 8.

Final Office Action in U.S. Appl. No. 12/971,782, dated Jan. 31, 2013, filed Dec. 17, 2010, pp. 11.

Non-final Office Action in U.S. Appl. No. 12/971,782, dated Apr. 10, 2014, filed Dec. 17, 2010, 11 Pages.

Final Office Action in U.S. Appl. No. 12/971,782, dated Dec. 4, 2014, pp. 13.

Notice of Allowance in U.S. Appl. No. 12/971,782, dated Apr. 2, 2015, pp. 10.

Non-final Office Action in U.S. Appl. No. 14/790,336, dated Oct. 8, 2015, 10 Pages.

"Non-Final Office Action issued in U.S. Appl. No. 14/793,926", dated Jun. 7, 2016, 12 pages.

"Final Office Action issued in U.S. Appl. No. 14/794,021", dated Jun. 16, 2016, pp. 11.

"Notice of Allowance Issued in U.S. Appl. No. 12/972,205", dated Jan. 13, 2016, pp. 17.

Non-Final Office Action Issued in U.S. Appl. No. 12/972,144, dated Jan. 14, 2013, 23 Pages.

Non-Final Office Action Issued in U.S. Appl. No. 12/972,144, dated Jul. 9, 2013, 26 Pages.

"Final Office Action Issued in U.S. Appl. No. 12/972,144", dated Nov. 20, 2013, 29 Pages.

"Non-Final Office Action Issued in U.S. Appl. No. 12/972,144", dated Jun. 9, 2014, 16 Pages.

Notice of Allowance Issued in U.S. Appl. No. 12/972,144, dated Dec. 2, 2014, 5 pages.

Notice of Allowance Issued in U.S. Appl. No. 12/972,144, dated Feb. 20, 2015, 5 pages.

(56) References Cited

OTHER PUBLICATIONS

Non-Final Office Action Issued in U.S. Appl. No. 12/819,493, dated Mar. 30, 2012, 16 pages.
Final Office Action Issued in U.S. Appl. No. 12/819,493, dated Aug. 15, 2012, 17 pages.
Non-Final Office Action Issued in U.S. Appl. No. 12/819,493, dated Apr. 10, 2013, 17 pages.
Final Office Action Issued in U.S. Appl. No. 12/819,493, dated Nov. 5, 2013, 21 pages.
Non-Final Office Action Issued in U.S. Appl. No. 12/819,493, dated Mar. 21, 2014, 21 pages.
Notice of Allowance Issued in U.S. Appl. No. 12/819,493, dated Oct. 14, 2014, 15 pages.
"Document Processing System" http://www.wolfram.com/products/mathematica/analysis/content/DocumentProcessingSystems.html, Nov. 16, 2007, 2 Pages.
"Introduction to the XML Pipeline Definition Language (XPL)"—Retrieved Date: Sep. 15, 2010; http://www.orbeon.com/orbeon/doc/reference-xpl-pipelines, 24 pages.
"Optimizing forms processing"—Retrieved Date: Sep. 15, 2010; http://www.movetonow.com/content/optimizing_forms_processing, 2 pages.
Frisch, et al., "Streaming XML transformations using term rewriting" http://pauillac.inria.fr/~frisch/xstream/long.pdf, 2007, 13 Pages.
Gardarin, et al. "XML-based Components for Federating Multiple Heterogeneoius Data Sources", Lecture Notes in Computer Science, http://dntt.free.fr/public/er1999.pdf, 1999, 14 pages.
Jelinek, et al., "XML Visualization Using Tree Rewriting" http://mummy.intranet.gr/includes/docs/Conferences/_02_XMLvisualization-Jelinek-SCCG04.pdf, 2004, 14 Pages.
Page, S., "XSL Pipeline Processing" http://www.usingxml.com/Transforms/XslPipelines, Jul. 2, 2007, 6 pages.
"How to Customize Ubuntu into your own custom distribution," Retrieved at <<http://www.linuxquestions.org/questions/ubuntu-63/how-to-customize-ubuntu-into-your-own-custom-distribution-663412/>, Aug. 17, 2008, 10 pages.
"LeoStatistic—building histogram, curve fit, multivariate regression, data modeling software", Retrieved at «http://www.leokrut.com/leostatistic.html» Retrieved Date Sep. 21, 2010, 6 Pages.
"Publishing applications to market place", Retrieved at <<https://help.creator.zoho.com/Publishing-applications-to-market-place.html>>, Retrieved Date Nov. 26, 2010, 5 pages.
"Quella Business Intelligence Package", Retrieved at «http://www.shareit.com/prod uct. html?cookies= 1 &productid=300100398&affiliateid=2000122751», 1 page.
"Square your search results with Google Squared", Retrieved at <<http://googleblog.blogspot.com/2009/06/square-your-search-results-with-google.html>>, Jun. 2009, 4 pages.
"User Customization", Retrieved at «http://docstore.mik.ua/orelly/perl3/tk/ch16_01.htm», Retrieved Date Nov. 26, 2010, 4 pages.
Windows Azure and Cloud Computing, Retrieved at <<http://oakleafblog.blogspot.com/2010/09/windows-azure-and-aloud-computing-posts 09.html», Sep. 9, 2010, 68 Pages.
Ayachit et al., "Customizing ParaView," Retrieved at «http://www.itk.org!Wiki/imaoes/7/77/Brandina oaper.pdf>>, Oct. 2009, 3 pages.
Banerjee, Atanu, "The 2007 Microsoft Office System and Other Platform Technologies for Building Composite Applications", Retrieved at «http://msdn.microsoft.com/en-us/librarv/bb220802.asox», Dec. 2006, 14 Pages.
Biddick, Michael "Six Questions to Ask Before Buying End-to-End APM", Retrieved at <<http://www.networkcomputing.com/end-to-end-apm/6-questions-to-ask-before-buying-end-to-end-aom.pho», Jun. 21, 2010, 9 Pages.
Collins, J., "Using Innovation in Technology to Create New Business Models," Retrieved at «http://www.theshiftonline.com/?p=666», Oct. 25, 2010, 3 Pages.
Delaney, A., "Direct Data Feed Services," Retrieved at «http://www.a-teamgroup.com/?dl id=7460&dl cm=on&dlla=O&dl ls=O», Jun. 2010, 8 pages.

Janeiro, et al., "Improving the Development of Service-Based Applications Through Service Annotations," Retrieved at «http://www.m.int.tu-dresden.de/uoloads/Publikationen/AnnotationPaperVI/WW-Internet2009.pdf», 2009, 8 pages.
Johnson, et al., "Building ETL Processes for Business Intelligence Solutions," Retrieved at <<http://www.ca.com/flles/whitepapers/ca-erwin-building-etl-processes-sql-wp-us-en.pdf>>, Jul. 10, 2008, 6 Pages.
McNee et al., "Creating Auction Ads for Marketplaces," Retrieved at «http://e-articles.info/e/a/title/Creatina-Auction-Ads-for-Marketplaces/», Apr. 2007, 2 Pages.
Mostarda et al., "MU: an hybrid language for Web Mashups," Retrieved at «http://em-up.googlecode.com/svn/wiki/papers/www2009.pdf», 2009, 10 pages.
Nagel, Nick, "Enterprise Data Modeling Using XML Schema," Retrieved at «http://citeseerx.ist.psu.edu/viewdoc/download?doi=10.1.1.135.6120&rep=rep1&type=pdf», 2007, 30 pages.
Ravindran, Karthik, "Integrating LOB Systems with the Microsoft Office System," Retrieved at «htto://msdn.microsoft.com/en-us/librarv/bb896607.aspx»Nov. 2007, 18 Pages.
Spillner et al., "Flexible Human Service Interfaces," Retrieved at «http://citeseerx.ist.psu.edu/viewdoc/download?doi=10.1.1.70. 7734&rep=rep1 &type=pdf», 2007, 7 Pages.
White, Colin J., "IBM enterprise analytics for the intelligent e-business," Retrieved at «http://sysdoc.doors.ch/IBM/bi.pdf», Sep. 2001, 34 Pages.
Berg, Dr. Bjarne, "A comprehensive guide to SAP NetWeaver Visual Composer", 2009, SAP insider. 81 Pages.
Cheng, et al., "An Ontology-Based Business Intelligence Application in a Financial Knowledge Management System", 2008, pp. 3614-3622.
Zhang, et al., "A Feasible Enterprise Business Intelligence Design Model", 2009, pp. 182-187.
Zhang, et al., "Improvement Design on the Data Structure of Business Intelligence", 2011, pp. 313-321.
Ren, Zhijun, "Practicing for Business Intelligence Application with SQL Server 2008", 2010, pp. 1499-1503.
Evans, Will, "Dynamic Visualization: Introduction & Theory", Available at: http://web.archive.org/web/20090609074938/http://blog.semanticfoundry.com/2009/06/01/dynamic-visualization-introduction-theory, Jun. 0, 2009, 4 pages.
Hibino, "Processing Incremental Multidimensional Range Queries in a Direct Manipulation Visual Query Environment", In Proceedings of the IEEE 14th International Conference on Data Engineering, Feb. 23, 1998, 8 Pages.
Tory, et al., ""Rethinking Visualization: A High-Level Taxonomy"", Available at:http://citeseerx.ist.psu.edu/viewdoc/download?doi=10.1.1.94.2968&rep=rep1&type=pdf, Jan. 2005, 8 Pages.
Webb, et al., "The In-Context Slider: A Fluid Interface Component for Visualization and Adjustment of Values while Authoring", In Proceedings of the Working Conference on Advanced Visual Interfaces, May 28, 2008, 8 Pages.
Yi, et al., "Dust & Magnet: Multivariate Information Visualization Using a Magnet Metaphor", Information Visualization, vol. 4, Issue 4, 2005, 29 Pages.
Non-final Office Action in U.S. Appl. No. 12/972,205, dated Nov. 26, 2012, pp. 33.
Final Office Action in U.S. Appl. No. 12/972,205, dated Jun. 7, 2013, pp. 35.
Non-final Office Action in U.S. Appl. No. 12/972,205, dated Apr. 22, 2015, pp. 32.
Notice of Allowance in U.S. Appl. No. 12/972,205, dated Sep. 14, 2015, pp. 17.
Non-final Office Action in U.S. Appl. No. 12/971,462, dated Mar. 21, 2013, filed Dec. 17, 2010, pp. 21.
Final Office Action in U.S. Appl. No. 12/971,462, dated Sep. 18, 2013, filed Dec. 17, 2010, pp. 24.
U.S. Appl. No. 12/971,462, Notice of Allowance dated Feb. 26, 2015, pp. 13.
Non-final Office Action in U.S. Appl. No. 12/971,638, dated Aug. 30, 2012, filed Dec. 17, 2010, pp. 18.
Final Office Action Issued in U.S. Appl. No. 12/971,638, dated Feb. 25, 2014, filed Dec. 17, 2010, 11 Pages.

(56) References Cited

OTHER PUBLICATIONS

Non-final Office Action in U.S. Appl. No. 12/971,638, dated Nov. 18, 2014, pp. 12.
Notice of Allowance in U.S. Appl. No. 12/971,638, dated Apr. 8, 2015, pp. 16.
Non-final Office Action in U.S. Appl. No. 12/971,685, dated Jul. 13, 2012, filed Dec. 17, 2010 pp. 9.
Final Office Action in U.S. Appl. No. 12/971,685, dated Oct. 11, 2012, filed Dec. 17, 2010, pp. 16.
"Final Office Action Issued in U.S. Appl. No. 14/721,353", dated May 18, 2017, 21 Pages.
"Non Final Office Action Issued in U.S. Appl. No. 14/721,353", dated Aug. 3, 2016, 27 Pages.
"Final Office Action Issued in U.S. Appl. No. 14/793,926", dated Dec. 14, 2016, 14 Pages.
"Final Office Action Issued in U.S. Appl. No. 14/794,021", dated Jun. 22, 2017, 16 Pages.
"Final Office Action Issued in U.S. Appl. No. 14/794,021", dated Oct. 1, 2018, 19 Pages.
"Non Final Office Action Issued in U.S. Appl. No. 14/794,021", dated Dec. 13, 2016, 12 Pages.
"Non Final Office Action Issued in U.S. Appl. No. 14/794,021", dated Dec. 14, 2017, 18 Pages.
"Final Office Action Issued in U.S. Appl. No. 15/098,113", dated May 17, 2018, 21 Pages.
"Non Final Office Action Issued in U.S. Appl. No. 15/098,113", dated Jul. 27, 2017, 25 Pages.
Loser, Alexander, et al., "Situational Business Intelligence", In Proceedings of the International Workshop on Business Intelligence for the Real-Time Enterprise, Aug. 24, 2008, pp. 1-11.
Negash, Solomon, et al., "Business Intelligence", In Proceedings of the Communications of the association for information systems, Feb. 15, 2004, pp. 3190-3199.
Tseng, Frank, et al., "The concept of document warehousing for multi-dimensional modeling of textual-based business intelligence", In Proceedings of the Decision Support Systems, vol. 42, Issue 2, Nov. 1, 2006, pp. 727-744.
Wang, Hai, et al., "A knowledge management approach to data mining process for business intelligence", In Proceedings of the Industrial Management & Data Systems, May 23, 2008, pp. 622-634.
"Notice of Allowance Issued in U.S. Appl. No. 14/794,021", dated Mar. 27, 2019, 18 Pages.
"Non Final Office Action Issued in U.S. Appl. No. 15/098,113", dated May 30, 2019, 13 Pages.

* cited by examiner

BUSINESS APPLICATION PUBLICATION

CROSS-REFERENCE TO RELATED APPLICATIONS

This application is a continuation of U.S. patent application Ser. No. 12/971,782, filed Dec. 17, 2010, entitled "Business Application Publication," which is incorporated herein by reference. This application is related to U.S. patent application Ser. No. 12/971,462, entitled "Business Intelligence Document"; Ser. No. 12/971,685, entitled "Data Feed Having Customizable Analytic and Visual Behavior"; Ser. No. 12/971,638, entitled "Data Mining within a Business Intelligence Document"; Ser. No. 12/971,725, entitled "Automated Generation of Analytic and Visual Behavior"; Ser. No. 12/972,205, entitled "Representation of an Interactive Document as a Graph of Entities"; and Ser. No. 12/972,249, entitled "Representation of an Interactive Document as a Graph of Entities", all filed on Dec. 17, 2010 and all of which are specifically incorporated by reference herein for all that they disclose or teach. This application is also related to U.S. patent application Ser. No. 14/721,353, entitled "Business Intelligence Document," filed May 26, 2015.

BACKGROUND

Business intelligence (BI) refers to a broad category of applications and technologies for gathering, storing, analyzing, and providing access to data to help information workers (IWs) make better business decisions. BI applications typically address activities such as decision support systems, querying, reporting, online analytical processing (OLAP), statistical analysis, forecasting, and data mining. A variety of data sources may be accessed to provide input data relevant to the objectives of each BI application.

Discovering the data sources capable of providing this relevant input data can be difficult and time-consuming. First, a developer typically visits Web sites of numerous data source companies to determine which of them, if any, offer the relevant data in a package and at a price that meets the developer's needs. Second, upon identifying the appropriate data sources and data offered thereby, the developer purchases the data via separate transactions with each data source company. Third, the companies may deliver the purchased data to the developer in different formats, e.g., via Web service, Microsoft EXCEL® spreadsheet, a DVD of CSV data, XML data, RSS feeds, etc.

Furthermore, the step of determining whether a data source company offers the relevant data is particularly challenging. While a data source company may offer a directory of data feeds and display samples of the data to the developer (e.g., in a chart), such companies do not typically allow a developer to interact with a particular data feed, especially in combination with his or her own data and business logic, until he or she pays for the access. As such, the customer is unable to do a trial run with the data feed to make sure it provides the right data for a desired objective.

Moreover, providing example data-specific applications to attract prospective subscribers to a particular data feed implies a significant development effort by the data source companies. Yet, such companies are typically more skilled in data collection and provisioning than in significant application development efforts.

SUMMARY

Implementations described and claimed herein address the foregoing problems by providing a crowd sourcing solution to development, discovery and publication of decision applications (e.g., BI applications). Decision applications can be submitted from a user to a data warehouse in association with a data feed. One or more discovery properties are determined with regard to each application. The applications are made available to other client systems in association with the data feed. A relevant data feed and a relevant application can be identified based on satisfaction of a discovery request by the one or more determined discovery properties of the application. The application can be selected and downloaded to the user for evaluation and customization. The customized application can then be submitted to the data warehouse for publication with the other applications associated with the data feed.

In some implementations, articles of manufacture are provided as computer program products. One implementation of a computer program product provides a computer program storage medium readable by a computer system and encoding a computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

A data marketplace in the described technology represents a cloud-based service or on-premises/off-premises service that provides a marketplace for information, such as data, web services, and analytics. Content providers can use a data marketplace to make their datasets available to a wide online audience. Developers can write code on any platform to consume datasets received from a data marketplace. Subscribers can use a data marketplace to find datasets that address their needs through rich discovery features and purchase access to such datasets through a consistent transaction and billing framework. Example billing scenarios may include without limitation pay-as-you-go transactions, monthly subscriptions, enterprise volume licensing, pure virtual billing, etc. In one implementation, a data marketplace provides a subscriber with a data feed sourcing data with a consistent presentation and an ability to automatically generate new proxy classes (e.g., to make the communications between the data feed and a data consumer transparent).

Figure 1:
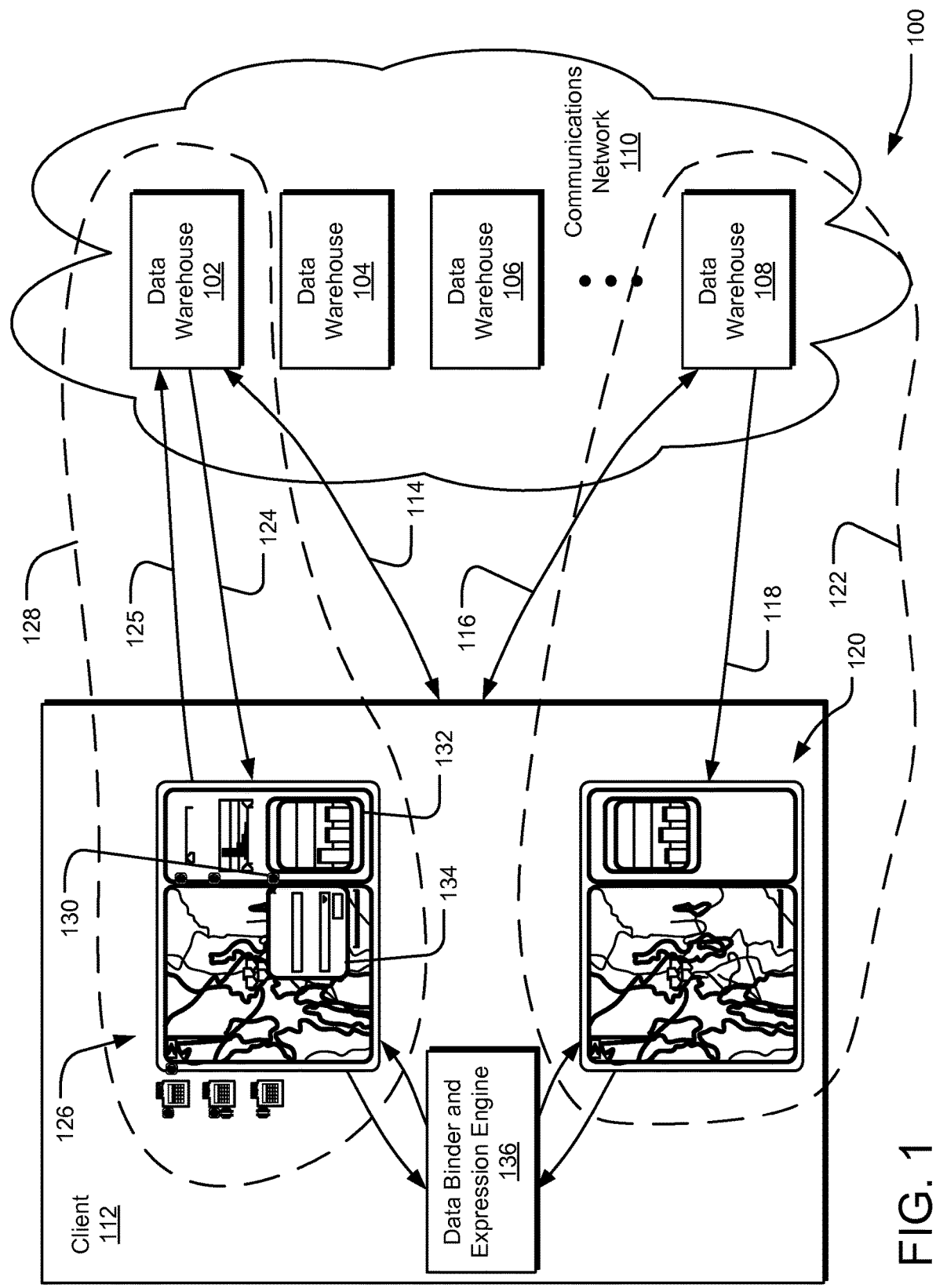
FIG. 1 illustrates an example data marketplace environment.

FIG. 1 illustrates an example data marketplace environment 100. The cloud-computing paradigm provides Web-based processing in which shared resources, software, and information are provided to computing devices (e.g., servers, client systems, mobile devices) on demand over a communications network, such as the Internet. The data marketplace concept provides a significant evolution in discovery, subscription, access, and publishing of data (e.g., both public and commercial) and associated business logic and user interfaces within the "cloud."

In FIG. 1, data warehouses 102, 104, 106, and 108 reside on a communications network 110. Each data warehouse stores and organizes data for access by authorized systems, such as BI clients executing BI applications on the data obtained from the data warehouse. Generally, each data warehouse represents a network-based data source, typically including one or more servers and/or data storage systems. With appropriate authorization, other computing systems can connect with such data sources via the Web to access select data, services, and other resources. Web services represent another example network-based data source. Typically, data feeds made available by a data source are organized in a browse-able directory, from which a data feed of interest may be selected by the prospective subscriber. The described technology enhances discovery of such data feeds and provides automated generation of one or more applications to allow interaction with the data of the data feed. In some cases, such applications may provide previews of data and interaction with such data (e.g., prior to subscription), but other applications may have broader applicability (e.g., the applications may remain accessible after subscription).

A client 112 (e.g., a client computer system) initially discovers a data feed for possible subscription (e.g., via communications 114 and 116) using a variety of mechanisms. In one implementation, the client 112 provides an identifier (e.g., a URI) of the data warehouse 102 and more specifically, of the specific data feed of interest. In another example, the data warehouse 108 generates and maintains a search index of text (e.g., discovery properties) residing in expressions of the business logic and user interface features of a data feed, wherein the client 112 can submit search queries to search on the text or patterns thereof in order to discover one or more data feeds of interest offered by the data warehouse 108. If the expressions associated with a data feed satisfy the search queries (e.g., as provided in a discovery request), then the data feed can be identified in discovery results returned to the client 112. A user can then select a data feed from the discovery results to receive an application associated with the selected data feed. In this manner, the data warehouse 108 assists the client 112 in identifying a data feed that may be relevant to a particular business intelligence objective. It should be understood that a web service or other application may be employed to distribute search queries to multiple data sources and to aggregate search results from across the multiple data sources. Other discovery mechanisms for identifying a data feed of interest may also be employed.

In one implementation, a BI document defines an application using a data structure of arbitrary expressions that can be specified by a non-programmer. In one implementation, a BI application defined by sets of such arbitrary expressions are grouped into distinct entities, which may have input variables and output variables, wherein the relationships among inputs and outputs of these entities defined by the sets of expressions that define the entities. The expressions are generally not unique to any particular system but may be evaluated by either a local or a remote system. However, an entity (and therefore the contained expressions) may be designated for local or remote computation on local or remote data, thereby directing computation to an appropriate system based on this designation.

Individual entities may be connected into a pipeline of entities, such that an output of one entity (e.g., an external equation set entity for remote computation) is connected to the input of another entity (e.g., an internal equation set entity of local computation), and so on. The input and output formats of connected entities are matched, such that the data output by one entity is compatible with the input format (e.g., schema) required by the entity to which that data is input. The pipeline-connection of multiple entities allows a user to specify an application for evaluating complex and arbitrary combinations of expressions using local or remote data and computation to obtain sophisticated solutions.

Furthermore, a non-programmer can develop an application defined by such expressions. In some implementations, the skill level adequate for a person to develop a BI application defined by expressions may be similar to the skill level adequate to use a spreadsheet software application, such as Microsoft EXCEL®.

An expression is a symbolic representation of a computation to be performed and may include operators and operands. Example operators of an expression may include without limitation mathematical operators (e.g., addition, subtraction, etc.), relational transformations (e.g., group, ungroup, join, filter, sort, etc.), aggregate transformations over nested structures (e.g., hierarchical filtering), classifiers (e.g., Bayesian algorithm that classified an unstructured set of data), BI aggregations and transformations, and arbitrary or customized transform expressions (e.g., sets of rules, equations, and/or constraints). Example operands of an expression may include without limitation data (e.g., numbers or strings), hierarchical data (such as records, tuples, and sequences), symbols that represent data, and other expressions that resolve to specific data. An expression may thus be recursive in that an expression may be defined by other expressions.

For example, an expression may take the form of a symbolic representation of an algebraic expression, such as $x^2+2xy+y^2$, where x and y are symbols that represent data or other expressions. A symbol may represent any type of data, including without limitation an integer, a rational number, a string, a Boolean, a sequence of data (potentially infinite), a tuple, or a record. In some implementations, a symbol may also represent an irrational number, although in other implementation, a symbol may be prohibited from representing an irrational number. Any expression may take the form of an equation, such as $E=mc^2$, where E, m, and c are symbols representing data or other expressions. An expression may also take the form of a functional definition, such as $f(x)=x^2-1$, where $f$ is a symbol representing the function, x is a symbol representing an operand or argument of the function, and $x^2-1$ is an expression that defines the function. In addition, an expression may take the form of a function invocation, such as $f(3)$, which indicates that the function $f$ is to be invoked with an argument of "3".

An expression may be solved by an expression engine (see expression engine 216 in FIG. 2) to produce a result (e.g., a solution or output). For example, where the symbol x (which is itself an expression) represents the number "3" and the symbol y (which is also an expression) represents the number "2," the expression $x^2+2xy+y^2$ may be solved by replacing the symbols with the values they represent, e.g., $2^2+2\cdot2\cdot3+3^2$, and then applying the operators to the operands to solve the entire expression to equal "25." In another example, where m is a symbol representing the number "2" and c is a symbol representing the number "2," the expression E, defined above, may be solved by replacing E with its definition (e.g., $mc^2$), replacing the symbols m and c with the values they represent (e.g., $2\cdot3^2$) and applying the operators to the operands to solve the expression to equal "18."

In evaluating an expression, the expression engine may apply the operators to the operands to the extent that the operators and operands are defined and to the extent that the expression engine is configured to apply the operators to the operands. For example, where the symbol x represents the number "3" and the symbol "y" is not yet defined, the expression $x^2+2xy+y^2$ may be solved by replacing the known symbol "x" with the value it represents (e.g., $2^2+2\cdot2\cdot y+y^2$) and then applying the operators to the operands to solve the entire expression as $4+4y+y^2$. Where the symbol x represents the number "3" and the symbol y represents the string "hello", the expression $x^2+2xy+y^2$ may be solved as $4+4\cdot hello+hello^2$, since the expression engine may not be configured to perform arithmetic operations on the string "hello".

Each expression can further specify a data source, whether local or remote. For example, an expression in which data values for x are taken from a local data source and data values for y are taken from a remote data source may be declared as follows:

$x^2+2xy+y^2$| where $x$ in local_table_contacts.Age and
$y$ in remote_table_contacts.Income Furthermore, each expression can further designate local or remote computation. For example, the computation entity may be specifically identified for an expression as such:

$x^2+2xy+y^2$|local_source.Solver or $x^2+2xy+y^2$|remote_source.Solver

In some implementations, expressions without a computation identifier are deemed local by default.

In some implementations, expression may be declarative. A declarative expression can identify a computation to be performed without specifying how to compute it. A declarative expression may be contrasted with an imperative expression, which may provide an algorithm or other specification for computing the expression. Declarative expressions may be input manually, such as into a field in a spreadsheet tool, or created through a declaration-generating control, such as a visual control element associated with a visualization.

In some implementations, expressions may be immutable. An expression is immutable if it cannot be changed. For example, once a definition is given to an immutable expression, such as if $E=mc^2$ is designated immutable, the expression E cannot later be given a different definition. One advantage of immutability is that a BI application having one or more expressions designated as immutable prevents users of the BI application from altering those expressions. Where expressions are being solved in a distributed execution environment, immutability may be advantageous in that devices can rely on the immutable expression having the same definition throughout the lifetime of the expression. Immutability of expressions can make it easier for independent parts of an application to execute in parallel.

As discussed, an application may be defined by a data structure of expressions. In one implementation, the application is represented by a graph of nodes or entities specified in the BI document, wherein one or more expressions are partitioned into individual entities and connected via related inputs and outputs. Based on the BI document, the application can provide spreadsheet-like, incremental recalculation behavior ("recalc"), solving expressions as the data upon which they depend changes. In addition, a BI tool and the BI document are coordinated to allow BI and other operations over heterogeneous complex data, including data sourced from local and remote data sources.

In one implementation, declarative expressions are recorded in the BI document 100 to define one or more entities in the graph, each entity representing without limitation a data structure, an external data source, a control element, an external event source, a visualization, or an update service. In one implementation, each entity transforms its inputs (if any) into its outputs (if any) and is associated with:

zero or more inputs from other entities, each input configured to accept data from outputs of other entities;
transform expressions that take a set of inputs and create a collection; and
zero or more outputs accessible by other entities, each output configured to emit output data generated by the entities transforms.

Figure 4:
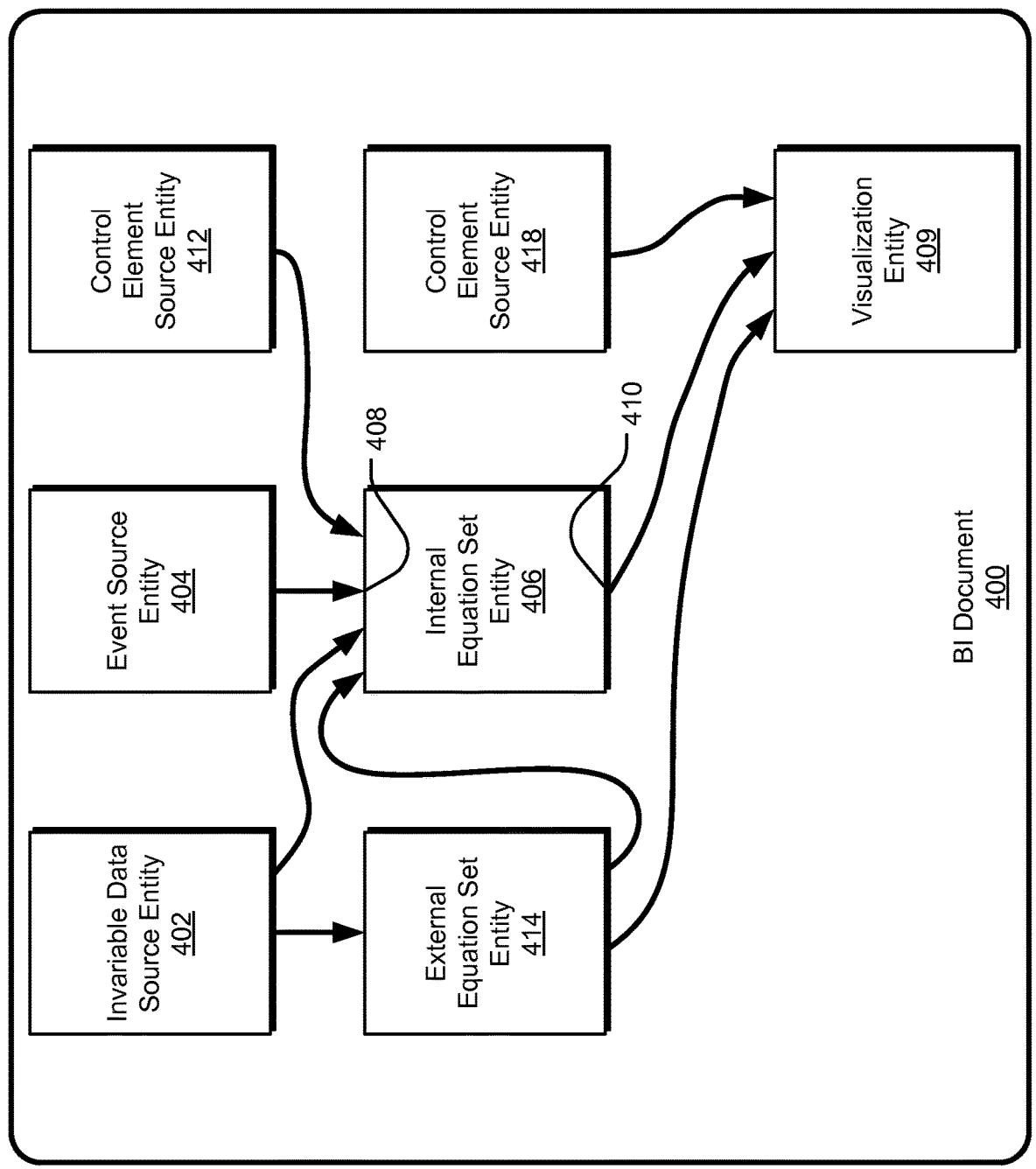
FIG. 4 illustrates an example BI document specifying a graph of connected entities (e.g., transformation nodes).

More details pertaining to entities are described with regard to FIG. 4.

As discussed, some applications may be manually generated by a non-programmer user or a program developer (e.g., based on the specific data of the data feed and an objective of providing insight into the data and available interactivity therewith). Other applications may be created through an automated generation process. In some automated generation implementations, an autogenerator engine searches a library of existing applications for visualization and business logic expressions that may be applicable to the data of the data feed. Factors suggesting applicability include without limitation similarity of data structures and subject matter. The autogenerator engine combines the identified expressions into a BI document specifying an application associated with the data feed and makes the BI document available to clients for use by clients. In one implementation, the autogenerated applications represent preview applications for the data feed.

Because the applications created through automated generation are not specifically created by a developer, there is a large possibility that any individual application does not provide acceptable interactivity for the data feed. For example, a histogram visual may be generated for a data feed that is better represented by a map visual. Accordingly, users can provide feedback indicating which applications met some or all of their interests in association with the data feed. Such feedback can then be used by the data feed to maintain the more successful applications and to delete or adjust the less successful applications.

In one example, the data warehouse 108 offers a data feed 118, which the client 112 selects (e.g., from a set of search results, from a directory of data feeds, via a provided identifier, etc.). The client 112 can also select to receive an application 120 associated with the data feed (e.g., as represented by a sample visualization and underlying business logic and data). The application, including any sample data, business logic and user interfaces associated therewith, is specific to the selected data feed, as represented by the dashed line 122 encompassing the application 120 and the data warehouse 108. Expressions of the application 120 are evaluated at the client 112, providing the client 112 with interactivity with sample data, business logic, and user interfaces.

In another example, the data warehouse 102 offers a data feed 124, which the client 112 selects for use via an application 126 of the data feed. The application 126, including any business logic and user interfaces associated therewith, is specific to the selected data feed, as represented by the dashed line 128 encompassing the application 126 and the data warehouse 102. Expressions of the application 126 are evaluated at the client 112, providing the client 112 with interactivity with some sample data, business logic, and user interfaces. Furthermore, in contrast to the application 120 associated with the data feed of the data warehouse 108, the application 126 associated with the data feed for data warehouse 102 is shown with customization icons (e.g., icon 130), which allow the client 112 to customize an associated visualization. For example, the customization icon 130 provides editable access to underlying data, business logic and user interfaces associated with a visualization 132, allowing customization (e.g., the altering of business logic expressions) by virtue of a control element 134. The client 112 can therefore manipulate the control element 134 to alter the sample data, business logic, and user interfaces received from the data warehouse 102 in the application 126.

A runtime component (e.g., data binder and expression engine 136) evaluates applications 120 and 126, including the sample data and expressions representing sample business logic and user interfaces. In this manner, a user at the client 112 can view a preview, for example, including manipulating the present control elements (e.g., a slider control) and, for some applications, customize the underlying data, business logic and user interfaces. Furthermore, the client 112 can save the state of such customizations and save them locally or return them to the associated data warehouse.

In addition, in one implementation, the expressions and data of the application can be in the form of textual data, which can be transferred from the application to another BI application at the client (e.g., via copy or cut, and paste logic or drag and drop logic). In this manner, a user can easily use applications to develop their own BI applications.

The data warehouse 102 also accepts such user-customized BI applications for publication. As such, a user can develop a BI application and submit it (e.g., in a communication 125) to the data warehouse 102 for use by other users. The BI application, for example, can be a customization that the user derived from a preview application the user downloaded from the data warehouse 102, although original BI applications may also be published by the data warehouse 102 subject to publication policies of the data warehouse 102. The BI application is then made available for downloading by others, typically remaining customizable by these subsequent downloaders.

Figure 2:
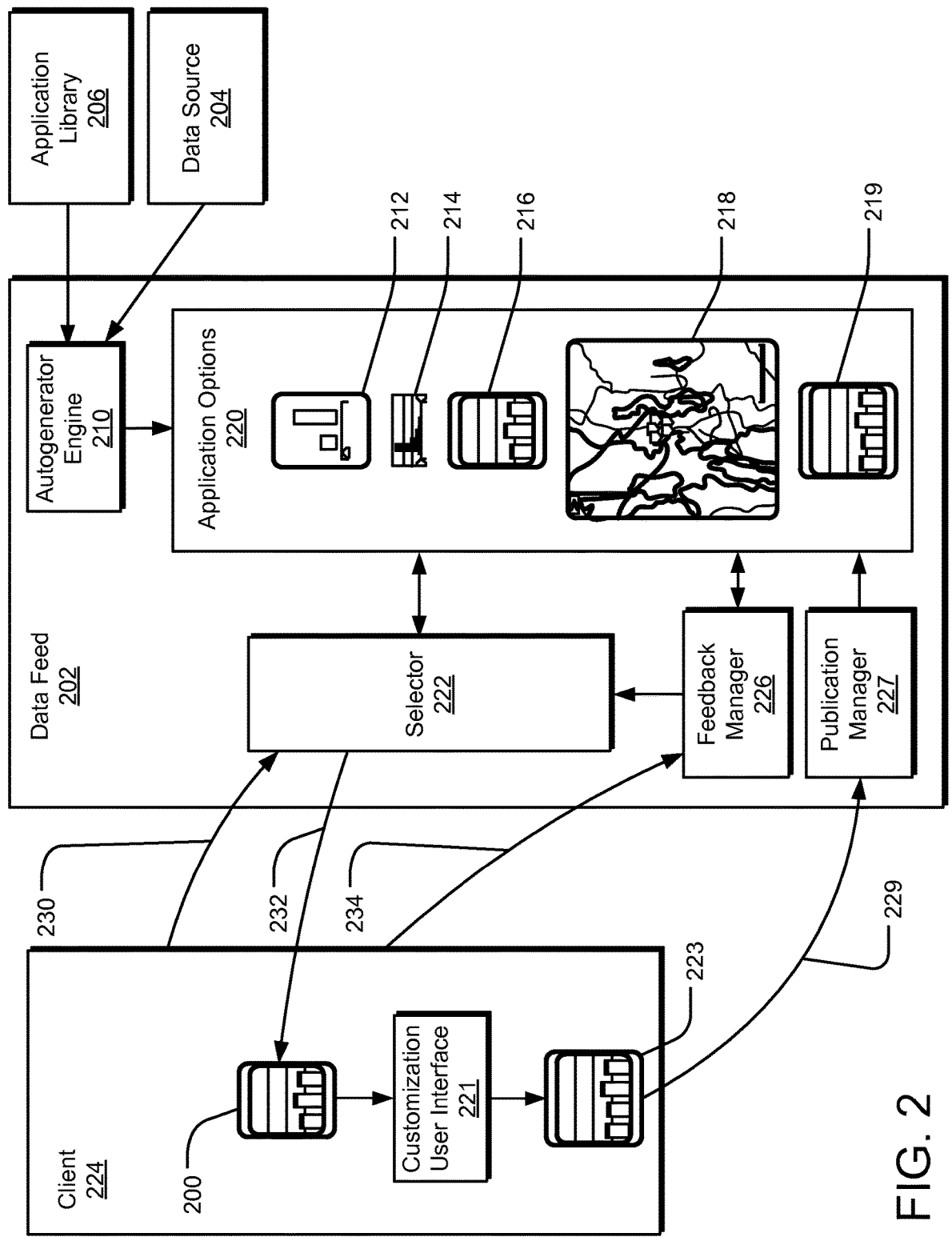
FIG. 2 illustrates an example of automated generation of a preview application in association with a data feed.

FIG. 2 illustrates an example of automated generation of an application 200 in association with a data feed 202. The data feed 202 provides access to data from a data source 204, such as relational database, a hierarchical database, an RSS feed, a data stream, etc. The data feed 202 also has access to an application library 206 of applications pertaining to the data in the data feed 202 and/or other data feeds.

An autogenerator engine 210 can evaluate the data from the datastore 204 against expressions from applications in the application library 206 to create new applications associated with the data feed 202. Applications from the application library 206 represent manually developed applications for a particular domain (e.g., with expressions bound to the domain of the related data feed). For example, the data feed 202 may provide residential real estate data to subscribers, and the application library 206 may include applications pertaining to real estate data provided by another data feed. As such, using business logic expressions and visualization expressions from real estate-related applications in the application library 206, the autogenerator engine 210 can create real estate-related applications that may be applicable to the real estate data of the data feed 202. Such autogenerated applications, such as applications 212, 214, 216, and 218, may be stored in a datastore of application options datastore 220. In one implementation, each application is stored in the form of a BI document, although other storage formats may be employed. By making these autogenerated applications available to clients, the data feed can allow clients to interact with its data. Furthermore, the business logic expressions and visualization expressions in the autogenerated applications may be copied and pasted into a client's own BI applications.

In one implementation, the autogenerator engine 210 determines characteristics about the data of the data feed 202 through various mechanisms, including without limitation analyzing the schema of the data, analyzing meta data associated with the data, analyzing visuals and business logic applied to the data by other users. Based on such characteristics, the autogenerator engine 210 can evaluate expressions from the applications in the application library 206 to find expressions applicable to the data of the data feed 202. The expressions used in a new application can be extracted from the existing business logic and user interfaces in the application library 208, copied into the new application, and stored into the application options datastore 220.

In one implementation, a factor in determining applicability of expressions relates to subject matter of the data and the application expressions. By identifying expression terms in the application library 206 that are exact matches or synonyms of data terms in the data feed, the autogenerator engine 210 can copy such expressions into a BI document that specifies the associated application functionality (e.g., a histogram visual). For example, the presence of "Lat" and "Long" (or synonyms thereof) in both the application and the schema of the data feed 202 suggests that the application may be applicable to the data of the data feed 202. It should be understood that matching terms of the data feed 202 may be attributed to atomic elements or more complex elements of the data (e.g., tuples, single columns, sub-hierarchies in XML, etc.). Likewise, the matching terms of the various applications may be attributed to expressions in individual entities (see the description regarding FIG. 4 for more details about entities) in the applications.

Another factor relates to the "shape" of the data from the data feed 202, such as whether the data is in the form of a continuous data stream, discrete sets of data, data having discontinuities, periodic sets of data, data that can be fitted to matching curve functions, etc. Other data shape similarities may also be evaluated.

The shape of the data refers to the structure of the data received from the data feed. For example, if the data feed provides residence address data, the "shape" of the data is relatively consistent across many data feeds. That is, the address data typically includes a first address field (e.g., street address), a second address field (e.g., suite or apartment number), a city, a state/province, and a postal or "zip" code field. By analyzing the shape of this address data and comparing it to a set of expressions (e.g., an entity defining a visualization) from another application that is designed to operate on address data having the same or similar fields, an autogenerator engine can determine that there is a high level of applicability of the expressions to the data of the new data feed. Based on this high level of applicability, the autogenerator engine can extract the set of expressions and insert them into a BI document to define an application.

In addition, the historical use of expressions representing visuals and/or business logic with the subject matter of the data feed or with data feeds having a similar shape can identify expressions that might be useful in association with the data feed. For example, if an application from the application library demonstrates a use of mapping visuals in association with address data, then the autogenerator engine may extract expressions specifying the mapping visuals from the library application and copy them into a new autogenerated application for use with the new data feed. Accordingly, the autogenerator engine employs an applicability criterion to identify expressions that may be appropriate for use with a certain data feed. The autogenerator engine inserts identified expressions into a BI document associated with the new data feed and places them with the application options datastore 220.

In one implementation, the applicability criterion includes a measure of similarity between the data of the data feed and the data upon which a set of application expressions operate, whether the structure of the data, the subject matter of the data, or both. For example, analysis of an address data feed and a mapping application may prove to demonstrate a high level of confidence in the applicability because the address fields of the address data feed match up well with the expressions of the mapping application. Other similarity measures may also be employed.

A selector 222 provides a client 224 with accesses to such applications, allowing the client 224 to select and download an application from the data feed 202. The client 224 can then execute and/or evaluate the downloaded application to interact with the data provided by the data feed 202.

In one implementation, the selector 222 presents the application options to clients in a wholly or partially randomized order. As clients browse, select, use, and provide feedback on multiple applications associated with the data feed 202, a feedback manager 226 collects such feedback (e.g., frequency of selection by clients, explicit feedback provided by clients via ratings, etc.) and ranks the application options accordingly. The selector 222 may use the ratings to determine whether to maintain each application in association with the data feed 202 or to delete lower rated applications, to highlight them for enhancement, etc.

Turning to the communications between the client 224 and the data feed 202, the client 224 communicates via signal 230 with the selector 222 to select one of the offered applications from the generated applications options datastore 220. For example, the client 224 can select a hyperlink, an item from a drop-down menu, etc. The selector 222 uploads the selected application 200 to the client 224 via a signal 232. The user at client 224 has an opportunity to view and/or manipulate the selected application 200 and provide feedback 234 to a feedback manager 226. For example, the user can give the selected application 200 a "thumbs up" or "thumbs down," a rating, or provide some other metric to assist the feedback manager 226 in discerning the user-perceived applicability of the selected application 200. If a large portion of the users who have interacted with the selected application 200 "approve" of it, then the feedback manager 226 may decide to maintain the availability of the selected application 200. In contrast, if a large portion of the users who have interacted with the selected application 200 "disapprove" of it, then the feedback manager 226 may decide to remove the availability of the selected application 200 or indicate a need to manually modify or adjust the selected application 200 to provide a more applicable option.

In one implementation, the data feed 202 also includes a publication manager 227 configured to receive applications (e.g., such as customized application 223) from the client 224 (via communication 229) for publication with the application options. Through the publication manager 227, a user can add his or her own applications to the applications available to other users for previewing the data of the data feed. The publication manager 227 receives such applications from clients and submits them to the application options datastore 220. In one implementation, the publication manager 227 performs certain checks on user-submitted applications, such as verifying the absence of malicious expressions, offensive language, etc. Furthermore, the submission interface of the publication manager 227 can allow the user to annotate the publication with keywords (e.g., discovery properties), licensing and payment terms, restrictions on editing and publication, etc.

Restrictions on editing may be enforced at the data feed 202 or a client that has downloaded the application. For example, an application author can designate certain expressions in the application to be redacted from editing or viewing (e.g., blacked out, whited out, greyed out, made non-selectable, etc.). In this manner, the author of an application can prevent others from altering, cutting-and-pasting, or even viewing certain expressions while still allowing others to derive customized applications from the author's application.

In one implementation, the application options can be repeatedly downloaded, customized and re-published in association with the data feed 202. In this manner, a large number and variety of applications may be generated and published through a "crowd-sourcing" activity in which multiple authors submit applications for publication and multiple users provide feedback on these applications so that the best applications "rise to the top."

Figure 3:
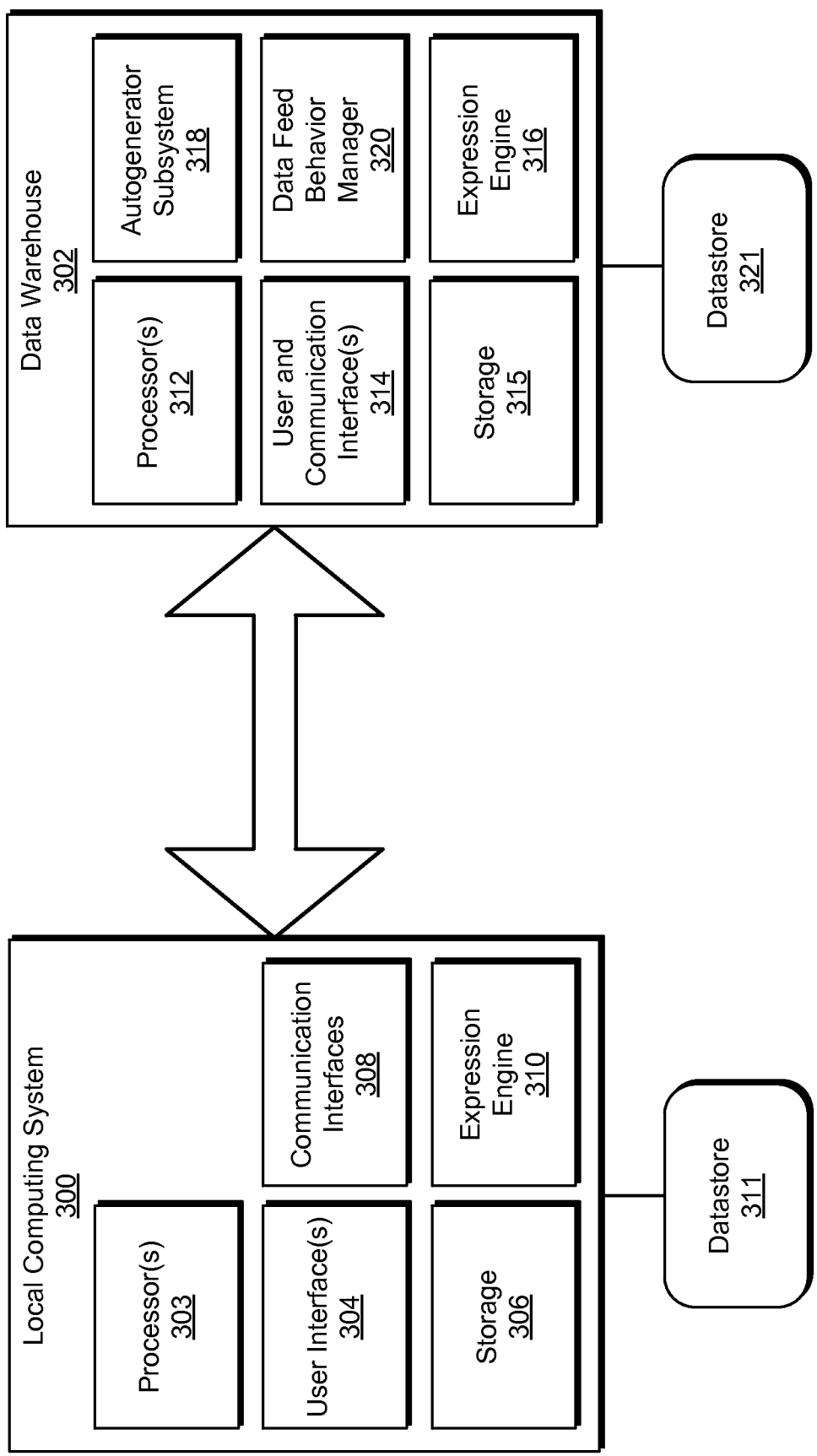
FIG. 3 illustrates components of an example local computing system interacting with components of an example data warehouse in a data marketplace environment.

FIG. 3 illustrates components of an example local computing system 300 interacting with components of an example data warehouse 302 in a data marketplace environment. The local computing system 300 includes one or more processors 303, one or more user interfaces 304 (e.g., a display interface, keyboard/mouse interface, touch screen interface, etc.), and local storage 306 (e.g., local RAM or flash memory, magnetic storage, a solid-state drive, etc.), and one or more communication interfaces 308 (e.g., a wireless or wired network interface). In addition, the local computing system 300 includes one or more local runtime components (e.g., expression engine 310) for evaluating expressions and data received in an application from the data warehouse 302. The local runtime components may also include without limitation a data-application binder for binding local (e.g., from local data store 311, which may physically reside in the local computing system or be readily accessible in a local area network) and remote data (e.g., accessible from other WAN-connected systems) to expressions of the application, text transfer logic (e.g., drag and drop logic, cut/copy and paste logic), and/or search logic providing a client-side interface for search queries and results.

The data warehouse 302 also includes one or more processors 312, one or more user and communication interfaces 314 (e.g., a display interface, keyboard/mouse interface, touch screen interface, a wireless or wired network interface, etc.), and its own local storage 315 (e.g., local RAM or flash memory, magnetic storage, a solid state drive, etc.). In addition, the data warehouse 302 includes one or more runtime components (e.g., data feed behavior manager 320) for providing customizable analytic and visual behavior to a data feed. In one implementation, the data feed behavior manager 320 receives sample data, business logic and user interfaces associated with a selected data feed and forwards them to a requesting client (e.g., the local computing system 300) as an application. The data feed behavior manager 320 may also include a publication manager that manages receipt of user-provided applications for publication into an application options datastore. The runtime components may also include without limitation an expression engine 316 for evaluating business logic and user interface expressions, and a data-application binder for binding local (e.g., from local data store 321, which may reside in the data warehouse 302 and remote data (e.g., accessible from other WAN-connected systems) to expressions when preparing the application.

In one implementation, an autogenerator subsystem 318 includes an autogenerator engine, a selector, an application options datastore, and a feedback manager, although other combinations of components may be employed. The autogenerator subsystem 318 manages the applicability analysis; the generation, storage, selection and downloading of generated applications; and the feedback management, which manages the availability of generated applications based on user feedback (e.g., determines whether to maintain, delete, or modify generated applications in the generated applications datastore).

FIG. 4 illustrates an example BI document 400 specifying a directed acyclic graph (DAG) of connected entities 402, 404, 406, 409, 412, and 414). The BI document 400 is associated with a particular data feed and specifies the data, business logic, and user interfaces for use in an application. Data and business logic may be designated for local evaluation (e.g., at the data warehouse that prepares and sends the application or at the local computing system that receives the application) or remote evaluation (e.g., at another specified remote system). Each entity is characterized by zero or more inputs (such as input 408), zero or more outputs (such as output 410), and a specified set of expressions (e.g., transforms) that can receive an input from another entity and/or create a collection for output to another entity.

Each entity can represent without limitation a data structure (e.g., a table or a hierarchical table), a terminal entity (e.g., a visualization or update service), a set of expressions with its bindings to identified data, an external data source (e.g., a remote data source, a query-able data source, a non-query-able data source, a control element that provides user interaction to allow data input, a remote service, etc.), and external event sources (e.g., timers). Each entity also defines the format of its one or more inputs and/or outputs. If the entity has an input, the entity further defines the source of the input data. The one or more expressions specified by each entity define transforms to be performed by the entity on its inputs (if any), the result of which is the output (if any) of the entity.

Individual entities may be characterized in a variety of ways, as described with regard to the example list below:

An equation set is represented as an entity having one or more inputs receiving data for computations and having one or more outputs for supplying the results of the computation to a subsequent entity in the directed graph, wherein the expressions specified by the entity represent the computations made on the input data to generate the output data.

An invariable data source may be represented as an entity with no inputs and an output capable of supplying data to a subsequently connected entity.

An external event source is also represented as an entity with no inputs and an output supplying the data resulting from an event (e.g., a timer event indicating that a timer identifies a current date or time, a user input event indicating that a user has entered the number '3'). An external event source is distinguished from an invariable data source because its output may change based on the state of the particular event.

A visualization is represented as an entity with inputs but no outputs (e.g., a terminal entity). A bar chart visualization, for example, may be represented as an entity having one input supplying its title and another input receiving a collection of pairs of categories and values.

An interactive control element may be specified by associating a visualization entity with an external data source entity representing a control element source entity. The control element source entity has no inputs and an output that supplies values corresponding to the user's manipulation of a displayed control element. By manipulating the associated control element (e.g., moving a slider in a single slider control element), the user causes data to be emitted from the output of control element source entity, which can then be connected to the input of a visualization entity to cause the slider movement to be presented visually to the user. An output of the control source entity would commonly also be input to an equation set, for example, to influence associated computations and potentially other visualizations, although other connections are also contemplated.

An updateable source/sink may also be specified by a pair of entities—a "source" entity, which accepts queries as inputs and emits query results as outputs and a "sink" entity representing a destination to which the query results (e.g., "updates") are output. In this manner, the entities represent in combination a single updatable data source/sink that is similar to the invariable data source but which reflects data changes based on changes in underlying data and the queries it receives.

It should be understood that other types of entities and connections are also contemplated in other implementations. In particular, multiple entities may be connected in a pipeline to produce a complex and arbitrary sequence of expressions designated for local and/or remote computation.

As data that is input to an entity changes, the expression engine re-evaluates the expressions specified by the entity. Accordingly, data changes and re-computation results can ripple through the directed graph, changing the output data that is altered by the re-computations and leaving the outputs of other entities unchanged (where the initial data changes do not ripple to these entities). This incremental change provides a spreadsheet-like recalculation ("recalc") effect—some data changes in the spreadsheet when data is changed, while other data remains unchanged.

Turning back to FIG. 4, the entity 402 represents an invariable data source, having one output but no input, and the entity 404 represents an event source, also having one output but no input, and further having output data that depends on the state of an event. Both the invariable data source entity 402 and the event source entity 404 supply their outputs to an internal equation set entity 406, which specifies one or more expressions for transforming the received data to output data of the entity 406. In this example, the expressions of the internal equation set entity 406 specify local computation and data, not remote computation and data. In contrast, another equation set entity, i.e., external equation set entity 414, specifies one or more expressions designating an external data source. As such, the expressions specified by the entity 414 are communicated to the designated external (e.g., remote) data source for remote computation on remote data. The solutions generated by the remote computation are communicated back to the local computing system for binding to the entity graph.

A control element source entity 412 also has no input and one output. The output data of the control element source entity 412 changes based on the state of an associated control element (e.g., a visual slider control), which can be manipulated by a user. For example, the associated control element may be presented to the user as a slider that the user can slide back and forth within a predetermined range to change the output value of the entity 412. A control element source entity 418 is also connected to the input of a visualization entity 409.

As illustrated, individual entities may be connected into a pipeline, where the local or remote location of the data and the computation for one entity are immaterial to any previous or subsequent entity in the pipeline. For example, an output of the invariable data source entity 402 is connected to the external equation set entity 414 and an output connected to the internal equation set entity 406. The external equation set entity 414 has one output connected to an input of the internal equation set entity 406. It should be understood that the input and output formats of connected entities are compatible to allow a first entity to output data directly to a second entity.

Further, among other connections, inputs to the internal equation set entity 406 are connected to outputs of the invariable data source entity 402, the event source entity 404, and the control element source entity 412. Also, as shown, outputs of the entities 406, 414 and 418 are input to the visualization entity 409, which has three inputs and no outputs. The visualization entity 409 alters a visualization presented to the user based on the data received at its inputs from the entities 406, 414, and 418. In this manner, changes to the outputs of the entities 406, 414, and 418 results in changes to the visual display viewed by user.

Figure 5:
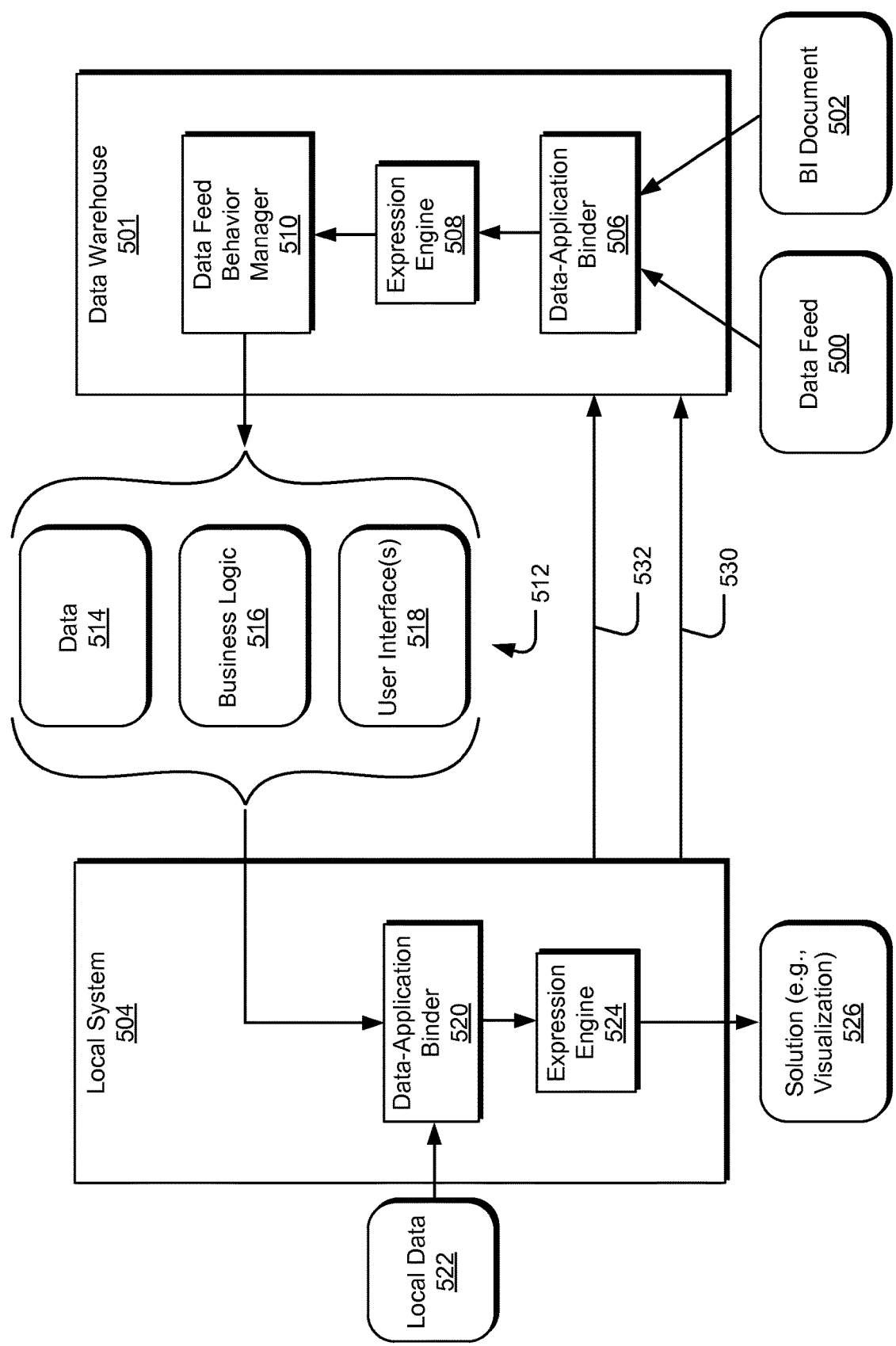
FIG. 5 illustrates an example data feed having automated generation of analytic and visual behavior.

FIG. 5 illustrates an example data feed 500 having analytic and visual behavior. The data feed 500 is made available by a data warehouse 501, typically through a discovery process. The data feed's behavior is defined by a BI document 502, which in one implementation stores a representation of an entity graph although other representations may be employed. In some implementations, the BI document 502 may be one of multiple BI documents available in association with the data feed, such that the local system 504 can select one or more applications defined by these BI documents to "try out" the data feed's data and some example analytic and visual behavior.

Responsive to selection of the data feed by a local client system 504 (e.g., via a data feed behavior manager 510), the data warehouse 501 inputs the data feed 500 and the BI document 506, which binds sample data from the data feed 500 to the expressions (or a subset of the expressions) recorded in the BI document 502. An expression engine 508 evaluates the expressions based on the available data and passes the expressions (e.g., evaluated or partially evaluated) to the data feed behavior manager 510.

The data feed behavior manager 510 receives the sample data, business logic and user interfaces from the expression engine 508 and forwards them in an application 512 to the requesting local system 504. In one implementation, the application 512 includes individual expressions and data representing the sample data 514, business logic 516, and user interfaces 518 for a preview. In another implementation, the data feed behavior manager 510 forwards the BI document 502 to the local system 504 as an application. In yet another implementation, the data feed behavior manager 510 generates a new BI document that includes representations of and/or references to the sample data, business logic, and user interfaces and forwards it to the local system 504 as an application. Other configurations and formats for the application are also contemplated.

The local system 504 receives the application 512, sending it to a data-application binder 520, which binds local data 522 and any other available data (e.g., local or remote solution data) to the expressions in the application 512. A local expression engine 524 evaluates the expressions in light of the bound data and outputs a solution 526 (e.g., a visualization). It should also be understood that the expressions in the application 512 may be evaluated locally or remotely, based on references associated with individual entities specified in the application 512.

The local system 504 can provide feedback communications 530 to the data warehouse 501 to allow a feedback manager of the data warehouse 501 to determine which applications are deemed most applicable to the data of the data feed. For example, for each user who accesses the data feed and is offered a list of application options, the data warehouse 501 presents the list to each user in a randomized order. As more and more users try out the applications and provide feedback, the more applicable applications are rated increasingly higher than the less applicable applications, which can then be culled from the list of options or modified for the objective of achieving a higher rating in the future.

The local system 504 may include a customization user interface to allow a user to generate a new application or customize a downloaded application. The local system 504 can provide a publication communication 532 to the data warehouse 501 to submit the application to the data warehouse 501 for publication. A publication manager of the data feed behavior manager 510 can receive the application, apply certain policies (e.g., language restrictions, etc.), and make the application available to other users in an application options datastore.

Figure 6:
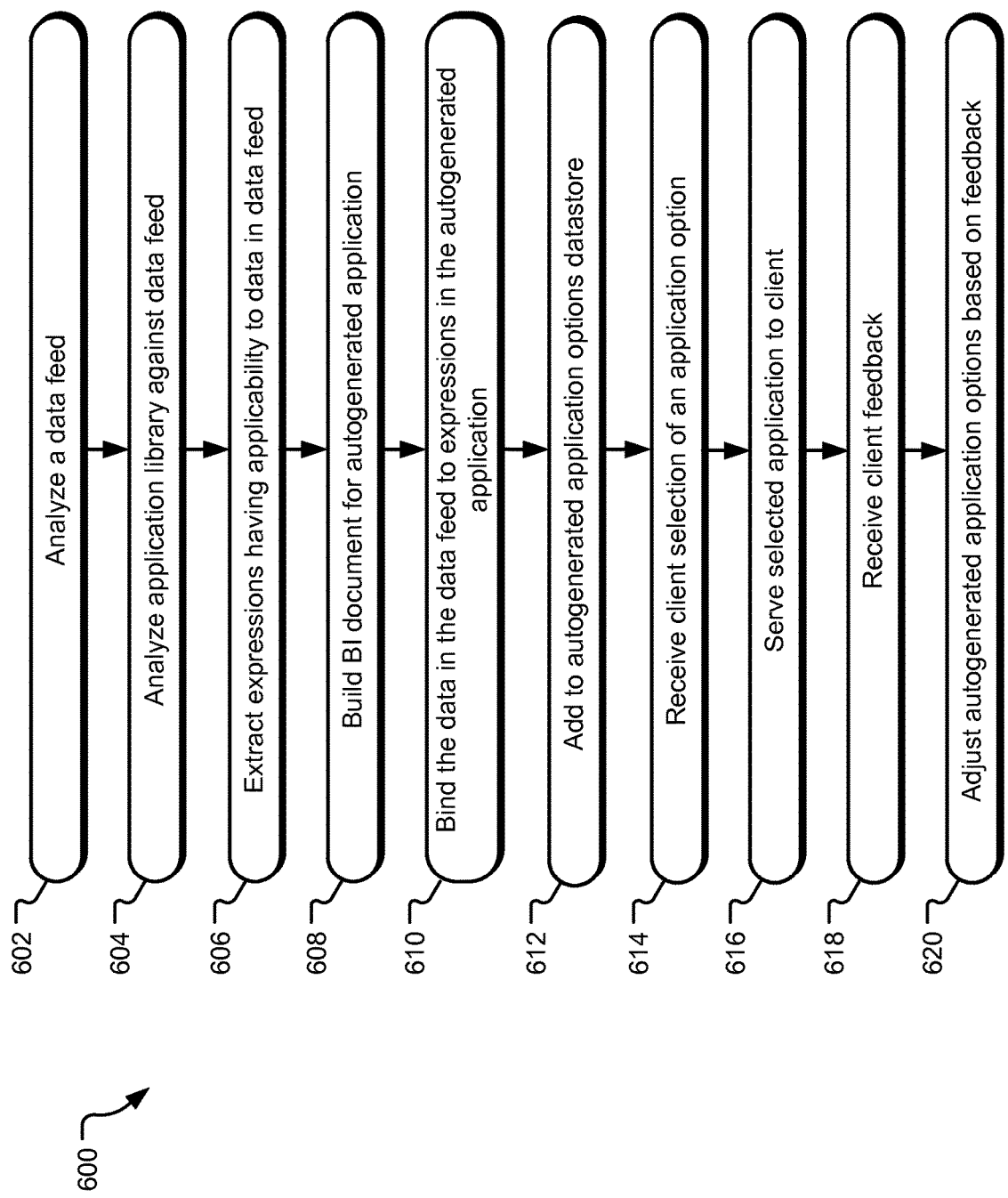
FIG. 6 illustrates example operations for automated generation of analytic and visual behavior.

FIG. 6 illustrates example operations 600 for automated generation of analytic and visual behavior. An analyzing operation 602 analyzes a data feed, including without limitation one or more of the subject matter and the data structure. Another analyzing operation 604 analyzes an application library, including without limitation one or more of the subject matter and structure of data on which each application operates. The analyzing operation 604 identifies expressions from the library applications that may be applicable to data in the data feed based on an applicability criterion.

An extraction operation 606 extracts the identified expressions from the library applications that satisfy the applicability criterion. In one implementation, the applications are defined by a BI document comprising a graph of expression-containing entities, and the extracted expressions are grouped in one or more entities. For example, expressions in an entity representing a map visual for residential data from a first data feed may satisfy applicability criteria pertaining to residential data in a second data feed. Accordingly, the expression in that visual entity can be extracted (e.g., copied) from the application having the visual entity. A building operation 608 can then insert the extracted expressions into a BI document representing a new application associated with the second data feed, resulting in an autogenerated application.

A binding operation 610 binds the data in the second data feed to the expressions in the autogenerated application. A storage operation 612 adds the autogenerated application to an application options datastore. For different clients, a list of the applications available can be randomized to develop a statistical model of those applications that are well received (and therefore worth maintaining in the options datastore) and those applications that are poorly received (and therefore worth deleting from the datastore or modifying in some way to improve their acceptance). A receiving operation 614 receives a client selection of the autogenerated application from a list of applications, and a serving operation 616 serves the selected operation to the client (e.g., via a downloading operation).

A feedback operation 618 receives client feedback pertaining to use of the autogenerated application. For example, a client may find the autogenerated application useless and therefore provide negative feedback about it. Alternatively, a client may find another autogenerated application much more useful and therefore provide positive feedback about it. Over time, after a statistically relevant number of feedback communications from clients, a profile of successful autogenerated applications and unsuccessful autogenerated applications can be developed. An adjusting operation 620 adjusts the application options available to clients in association with the data feed (e.g., maintaining successful applications, deleting unsuccessful applications, submitting unsuccessful applications for manual revision, etc.).

Figure 7:
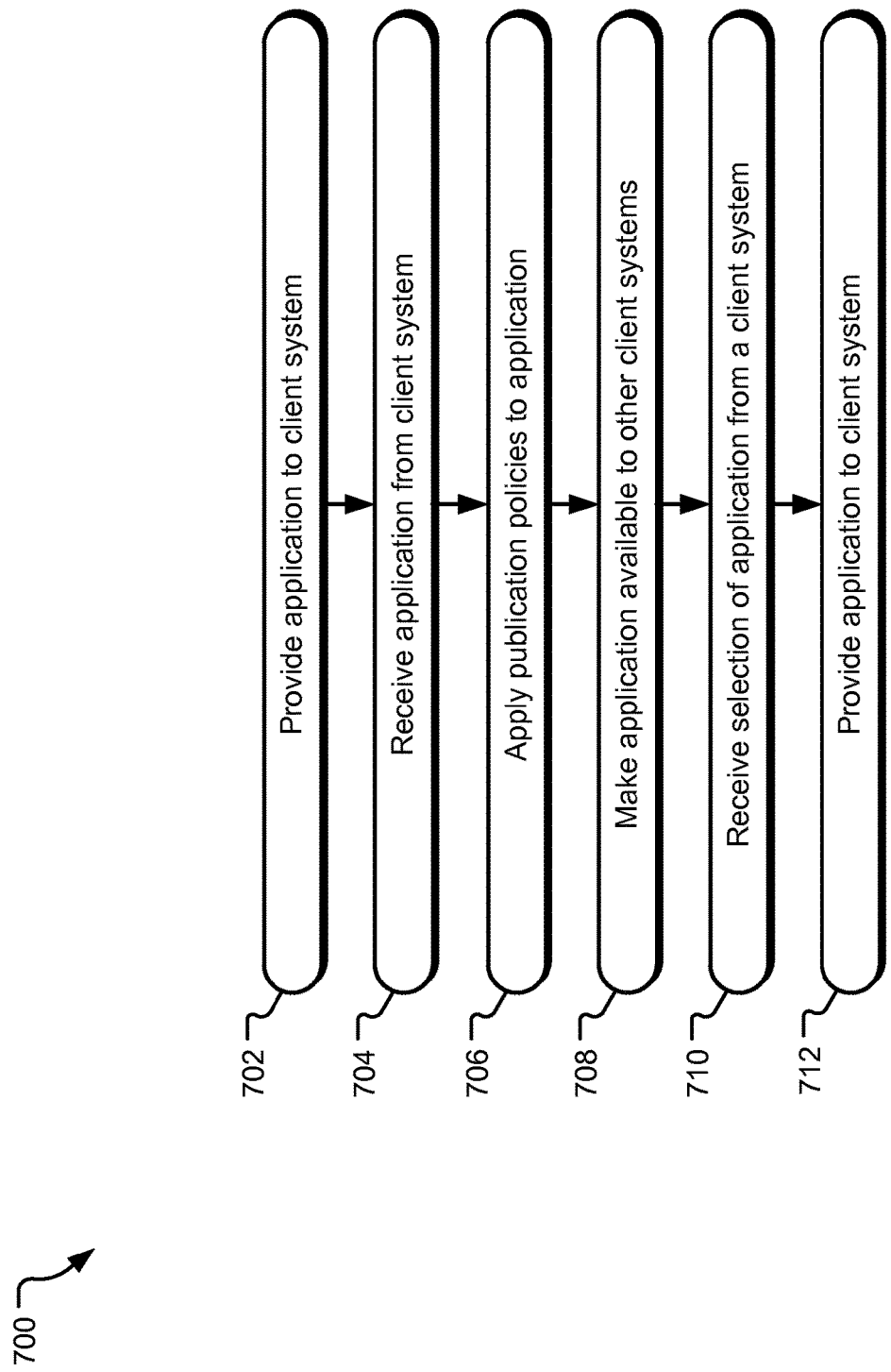
FIG. 7 illustrates example operations for publishing applications.

FIG. 7 illustrates example operations 700 for publishing applications. A downloading operation 702 provides an application to a client system. In one implementation, a user selects the application from an application options datastore and downloads it to the client system. A reception operation 704 receives an application (whether a new application or a customized version of the downloaded application) from a client system. In one implementation, a publishing manager receives the application via a communication network.

A policy operation 706 applies publication policies to the received application. In one implementation, the publication policies include a malicious expression filter, a foul language filter, etc. For example, if the received application is determined to include one or more expressions capable of corrupting data or operation of the data warehouse or a client system, the offending expressions may be deleted or the application may be precluded from publication. In another implementation, the publication policies (e.g., publications restrictions, in this case) restrict expressions from editing, selection, and/or viewing by other users. For example, if the user has designated one or more expressions as "view only," the publication policy interprets this designation and sets properties of the expressions to prevent editing, selection, or viewing of these expressions by a client system.

A publication operation 708 submits the application to an application options datastore to allow discovery and downloading of the application by other client systems. In one implementation, publication includes an indexing operation in which the expressions of the application are indexed and added to a searchable index associated with a data feed of the data warehouse. In this manner, the published application can be discovered by a user via search functionality. The application may additionally or alternatively be accessed via a menu, a directory structure, or another selection mechanism.

A client system designates a selection of the application, which is received via a reception operation 710. Responsive to the selection, a downloading operation 712 downloads the application to the client system. Such publication and republication can happen in multiple iterations, such that the number and variety of available applications continues to evolve.

Figure 8:
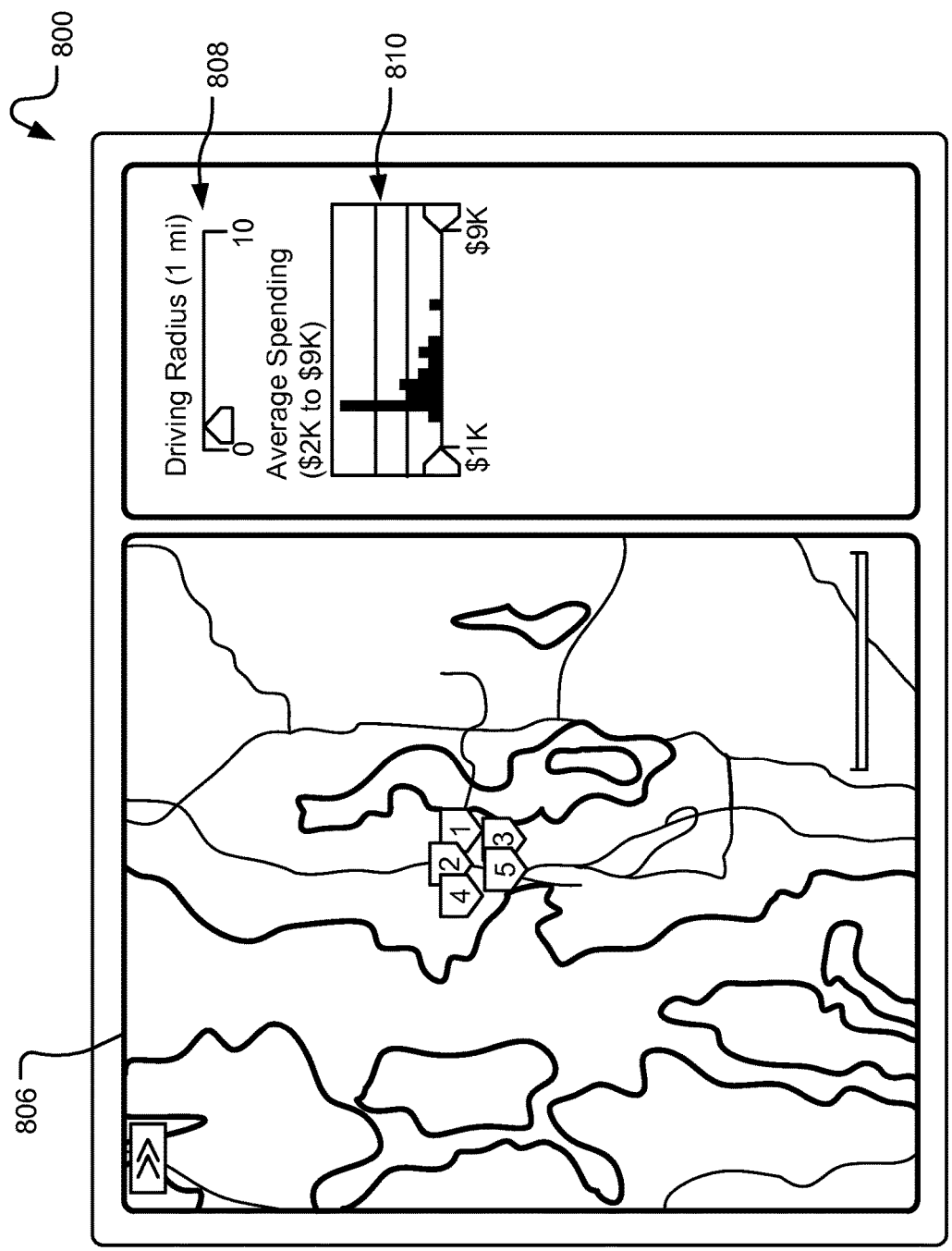
FIG. 8 illustrates example visuals of a preview application associated with a data feed.

FIG. 8 illustrates example visuals 800 of an autogenerated application associated with a data feed. In some cases, such as the map visual 806, map data is combined with solution data (e.g., the symbols marked "1", "2", "3", "4", and "5" on the map). The solution data results from underlying input data, transformations, and other input values configured through user interaction with the single slider control element 808 and the range control 810.

Figure 9:
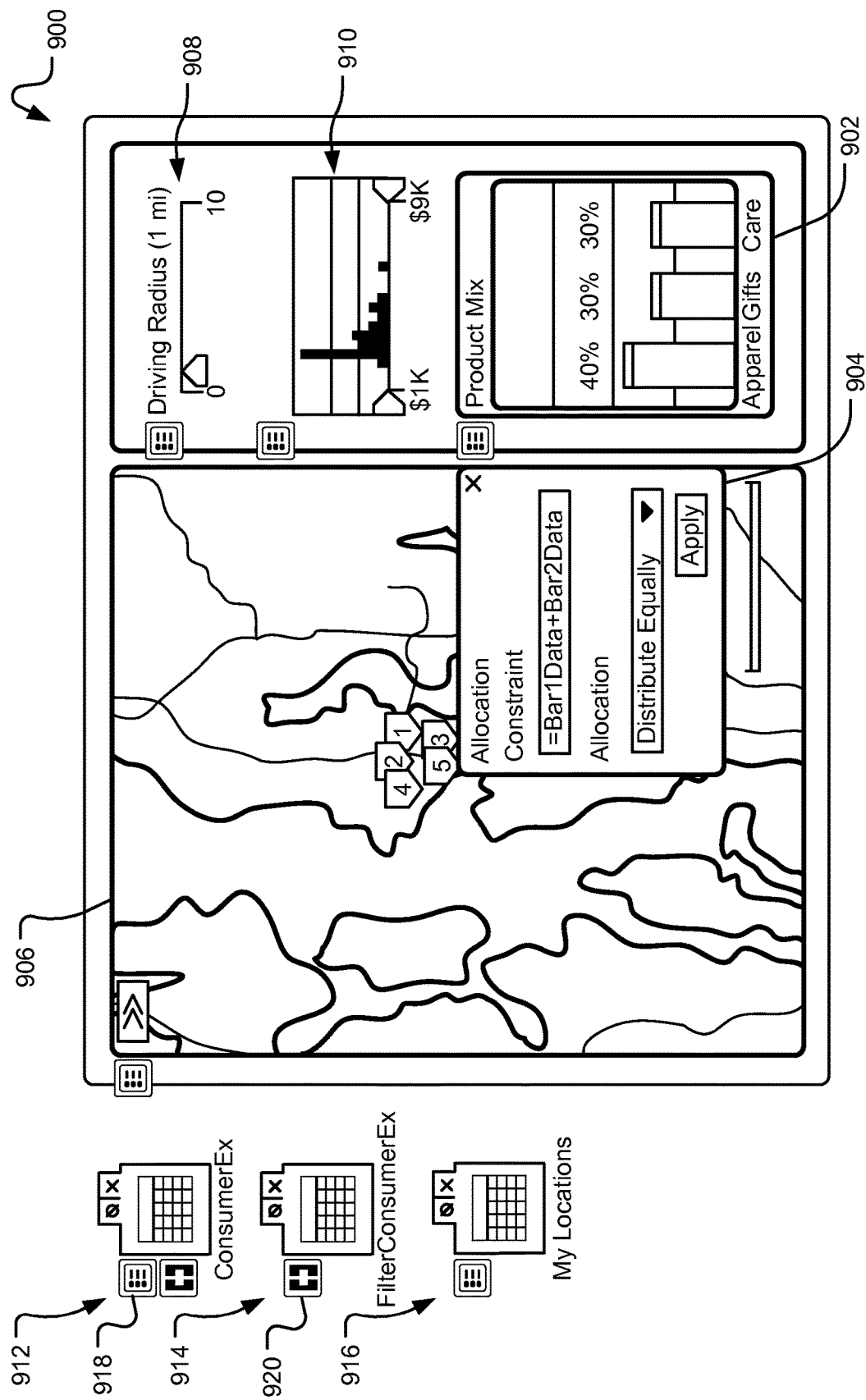
FIG. 9 illustrates example customizable analytic and visual behavior attached to a data feed.

FIG. 9 illustrates example customizable analytic and visual behavior attached to a data feed. Each visual represented by a terminal entity in a graph associated with a BI document presents a user with a view of input data and solutions resulting from associated transformations. In some cases, such as the map visual 906, map data is combined with solution data (e.g., the symbols marked "1", "2", "3", "4", and "5" on the map). The solution data results from underlying input data, transformations, and other input values configured through user interaction with the single slider control element 908 and the range control 910.

The new histogram visual element 902 is also based on input data and transformations, some of which are defined by a user through the control element 904. In the case of the control element 904, a user can configure a "constraint" transformation using a user-entered equation and an "allocation" transformation using a drop down box offering various selections (e.g., "Distribute Equally," "Weighted," etc.) Other transformations may also be applied to the input data in the configuration of the histogram visual 902 or any other visual element.

Other application controls are also shown in FIG. 9. The controls 912, 914, and 916 represent data source entities in a graph of entities. By selecting a data grid control, such as data grid control 918, a user can access the underlying input data of an associated data source. By selecting a logic control, such as logic control 920, a user can access the underlying business logic (e.g., transformations) applicable to the underlying input data.

Figure 10:
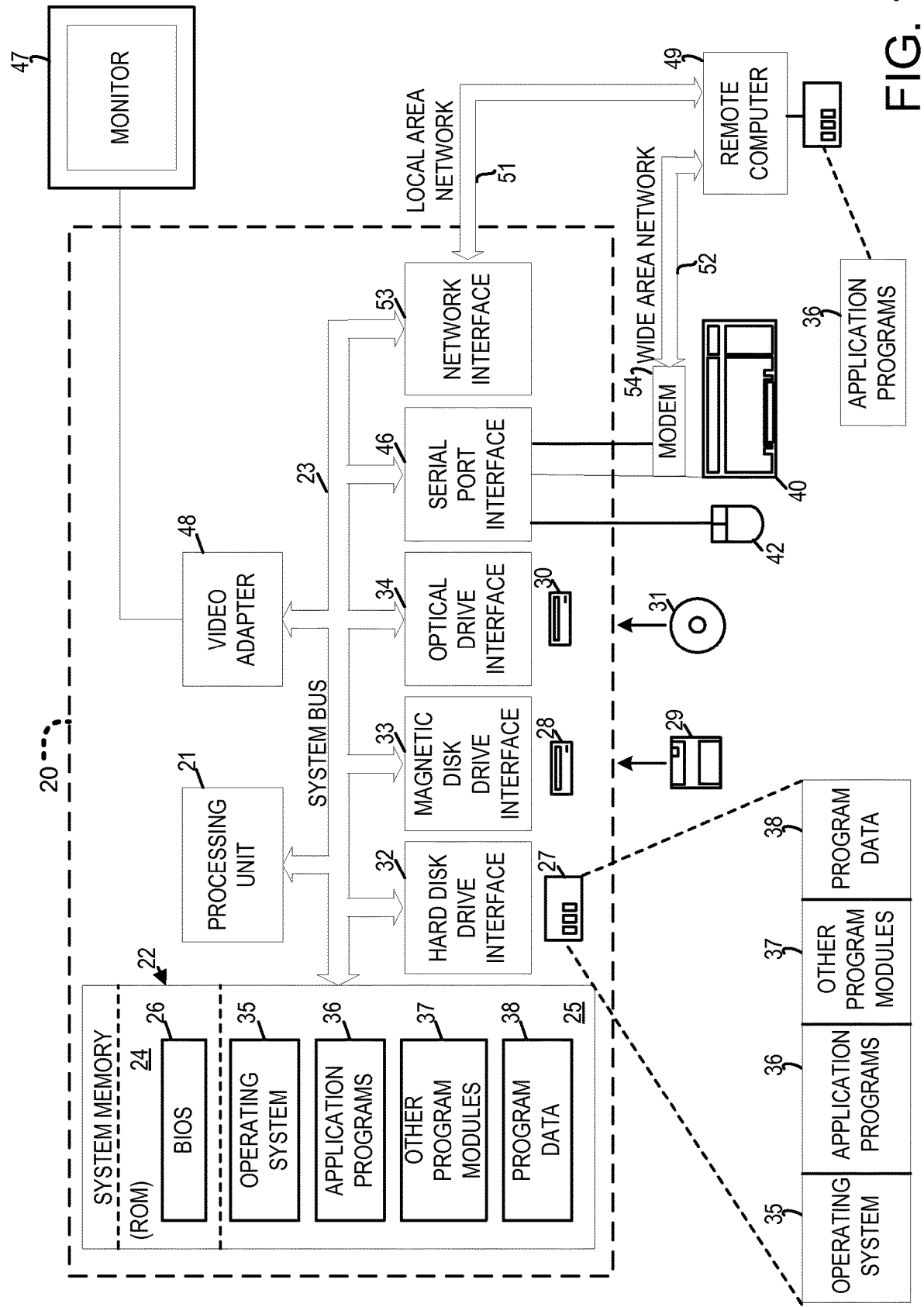
FIG. 10 illustrates an example system that may be useful in implementing the described technology.

FIG. 10 illustrates an example system that may be useful in implementing the described technology. The example hardware and operating environment of FIG. 10 for implementing the described technology includes a computing device, such as general purpose computing device in the form of a gaming console or computer 20, a mobile telephone, a personal data assistant (PDA), a set top box, or other type of computing device. In the implementation of FIG. 10, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 10. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an expression engine, an autogenerator subsystem, a publication manager, a data feed behavior manager, a discover services manager, and other modules and services may be embodied by instructions stored in memory 22 and/or storage devices 29 or 31 and processed by the processing unit 21. Source data, BI documents, an application library, applications, expressions, and other data may be stored in memory 22 and/or storage devices 29 or 31 as persistent datastores. Further, local computing systems, remote data sources and/or services, and other associated logic represent hardware and/or software configured to provide BI functionality for network-connected systems. Such services may be implemented using a general purpose computer and specialized software (such as a server executing service software), a special purpose computing system and specialized software (such as a mobile device or network appliance executing service software), or other computing configurations.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A computer implemented method comprising:
   providing a data warehouse, wherein the data warehouse provides access to a plurality of data feeds, the data warehouse having a discoverable application options data store comprising multiple computer executable applications, each of the multiple computer executable applications automatically generated and configured to operate on data of at least one of the plurality of data feeds, the data being bound to a respective one of the multiple computer executable applications, wherein access to any one data feed of the plurality of data feeds is made according to at least one of the multiple computer executable applications associated with a corresponding data feed, wherein each of the multiple computer executable applications comprises one or more computation expressions and is associated with the corresponding data feed according to one or more discovery properties of the multiple computer executable applications;
   receiving a discovery request from a requesting party, the discovery request identifying the one or more discovery properties of each of the multiple computer executable applications based on at least one computation expression;
   identifying a satisfying data feed from the plurality of data feeds;
   accessing the satisfying data feed according to the discovery properties of the discovery request via a selected one computer executable application associated with the satisfying data feed;
   transmitting the selected one computer executable application to the requesting party;
   receiving a first updated computer executable application from the requesting party, wherein the first updated computer executable application is an updated computer executable application of the selected one computer executable application;
   associating the first updated computer executable application with the satisfying data feed; and
   making the first updated computer executable application available to a plurality of third parties of the data warehouse in association with the data feed.

2. The computer implemented method of claim 1, further comprising:
   receiving a second discovery request from a second requesting party, the second discovery request identifying one or more discovery properties;
   identifying the satisfying data feed from the plurality of data feeds;
   selecting a second updated computer executable application according to the discovery properties of the second discovery request; and
   transmitting the second updated computer executable application to the second requesting party in association with the satisfying data feed.

3. The computer implemented method of claim 1, wherein discovery properties are searchable within the discoverable application options data store by the requesting party.

4. The computer implemented method of claim 3, wherein associating the first updated computer executable application with the satisfying data feed comprises:
   obtaining one or more keywords associated with the first updated computer executable application; and
   recording the one or more keywords in the discoverable application options data store as discovery properties of the first updated computer executable application.

5. The computer implemented method of claim 3, wherein associating the first updated computer executable application with the satisfying data feed comprises:
   identifying one or more terms from expressions within the first updated computer executable application; and
   recording the one or more terms from expressions within the discoverable application options data store as discovery properties of the first updated computer executable application.

6. The computer implemented method of claim 3, wherein the discoverable application options data store is an indexed data store according to discovery properties.

7. The computer implemented method of claim 1 further comprising applying one or more publication restrictions on the first updated computer executable application.

8. The computer implemented method of claim 7, wherein the one or more publication restrictions includes any one or more of an editing restriction, a selecting restriction, or a viewing restriction.

9. A computer readable medium, excluding transmission signals, for execution on a computer system by a computer processor to carry out a method comprising:
   providing a data warehouse, wherein the data warehouse provides access to a plurality of data feeds, the data warehouse having a discoverable application options data store comprising multiple computer executable applications, each of the multiple computer executable applications automatically generated and configured to operate on data of at least one of the plurality of data feeds, the data being bound to a respective one of the multiple computer executable applications, wherein access to any one data feed of the plurality of data feeds is made according to at least one of the multiple computer executable applications associated with a corresponding data feed, wherein each of the multiple computer executable applications comprises one or more computation expressions and is associated with the corresponding data feed according to one or more discovery properties of the multiple computer executable applications;
   receiving a discovery request from a requesting party, the discovery request identifying the one or more discovery properties of each of the multiple computer executable applications based on at least one computation expression;

identifying a satisfying data feed from the plurality of data feeds;

accessing the satisfying data feed according to the discovery properties of the discovery request via a selected one computer executable application associated with the satisfying data feed;

transmitting the selected one computer executable application to the requesting party;

receiving a first updated computer executable application from the requesting party, wherein the first updated computer executable application is an updated computer executable application of the selected one computer executable application;

associating the first updated computer executable application with the satisfying data feed; and making the first updated computer executable application available to a plurality of third parties of the data warehouse in association with the data feed.

10. The computer readable medium of claim 9, wherein the method further comprises:

receiving a second discovery request from a second requesting party, the second discovery request identifying one or more discovery properties;

identifying the satisfying data feed from the plurality of data feeds;

selecting a second updated computer executable application according to the discovery properties of the second discovery request; and transmitting the second updated computer executable application to the second requesting party in association with the satisfying data feed.

11. The computer readable medium of claim 9, wherein discovery properties are searchable within the discoverable application options data store by the requesting party.

12. The computer readable medium of claim 11, wherein associating the first updated computer executable application with the satisfying data feed comprises:

obtaining one or more keywords associated with the first updated computer executable application; and recording the one or more keywords in the discoverable application options data store as discovery properties of the first updated computer executable application.

13. The computer readable medium of claim 11, wherein associating the first updated computer executable application with the satisfying data feed comprises:

identifying one or more terms from expressions within the updated computer executable application; and recording the one or more terms from expressions within the discoverable application options data store as discovery properties of the first updated computer executable application.

14. The computer readable medium of claim 11, wherein the discoverable application options data store is an indexed data store according to discovery properties.

15. The computer readable medium of claim 9, the method further comprising applying one or more publication restrictions on the first updated computer executable application.

16. The computer readable medium of claim 15, wherein the one or more publication restrictions includes any one or more of an editing restriction, a selecting restriction, or a viewing restriction.

17. A computing system comprising at least a processor and a memory, wherein the processor executes instructions of one or more executable modules stored in memory or on a computer-readable medium, in providing a data warehouse, the executable modules comprising:

an application selector configured to, in execution:

receive a discovery request from a requesting party, the discovery request identifying one or more discovery properties of multiple computer executable applications based on at least one computation expression;

identify a satisfying data feed from a plurality of data feeds;

access the satisfying data feed according to the discovery properties of the discovery request via a selected one computer executable application associated with the satisfying data feed; and transmit the selected one computer executable application associated with the satisfying data feed to the requesting party; and a publication manager configured to, in execution:

receive a first updated computer executable application from the requesting party, wherein the first updated computer executable application is an updated computer executable application of the selected one computer executable application client system;

associate the first updated computer executable application with the satisfying data feed; and make the first updated computer executable application available to a plurality of third parties of the data warehouse in association with the satisfying data feed.

18. The computing system of claim 17, wherein the application selector is further configured to, in execution:

receive a second discovery request from a second requesting party, the second discovery request identifying one or more discovery properties;

identify the satisfying data feed from the plurality of data feeds;

select a second updated computer executable application according to the discovery properties of the second discovery request; and transmit the second updated computer executable application to the second requesting party in association with the satisfying data feed.

19. The computing system of claim 17, wherein discovery properties are searchable within the discoverable application options data store by the requesting party.

20. The computing system of claim 19, wherein the publication manager, to associate the first updated computer executable application with the satisfying data feed, is configured to:

obtain one or more keywords associated with the updated computer executable application; and record the one or more keywords in the discoverable application options data store as discovery properties of the first updated computer executable application.

21. The computing system of claim 19, wherein the publication manager, to associate the first updated computer executable application with the satisfying data feed, is configured to:

identify one or more terms from expressions within the first updated computer executable application; and record the one or more terms from expressions within the discoverable application options data store as discovery properties of the first updated computer executable application.

* * * * *